United States Patent
Diankov et al.

(10) Patent No.: US 11,797,926 B2
(45) Date of Patent: **\*Oct. 24, 2023**

(54) ROBOTIC SYSTEM WITH AUTOMATED OBJECT DETECTION MECHANISM AND METHODS OF OPERATING THE SAME

(71) Applicant: MUJIN, Inc., Tokyo (JP)

(72) Inventors: Rosen Nikolaev Diankov, Tokyo (JP); Russell Islam, Tokyo (JP); Xutao Ye, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,559

(22) Filed: Oct. 27, 2021

(65) Prior Publication Data
US 2022/0051411 A1   Feb. 17, 2022

Related U.S. Application Data

(63) Continuation of application No. 16/667,882, filed on Oct. 29, 2019, now Pat. No. 11,176,674.
(Continued)

(51) Int. Cl.
*G06T 7/13* (2017.01)
*G06Q 10/087* (2023.01)
(Continued)

(52) U.S. Cl.
CPC .......... *G06Q 10/087* (2013.01); *B25J 9/1676* (2013.01); *B25J 9/1687* (2013.01); *B25J 9/1697* (2013.01); *B65B 43/46* (2013.01); *B65G 61/00* (2013.01); *G05B 19/40935* (2013.01); *G06T 7/11* (2017.01); *G06T 7/13* (2017.01);
(Continued)

(58) Field of Classification Search
CPC .... G06T 7/13; G06T 7/62; G06T 7/50; G06T 7/11; G06T 7/73
See application file for complete search history.

(56) References Cited

U.S. PATENT DOCUMENTS

| | | |
|---|---|---|
| 4,907,169 A | 3/1990 | Lovoi |
| 5,812,395 A | 9/1998 | Mascianegelo et al. |

(Continued)

FOREIGN PATENT DOCUMENTS

| | | |
|---|---|---|
| CN | 1293752 A | 5/2001 |
| CN | 1135201 C | 1/2004 |

(Continued)

OTHER PUBLICATIONS

Non-Final Office Action dated Apr. 18, 2019 for U.S. Appl. No. 16/290,741, filed Mar. 1, 2019, 16 pages.
(Continued)

*Primary Examiner* — Gregory M Desire
(74) *Attorney, Agent, or Firm* — Perkins Coie LLP

(57) ABSTRACT

A system and method for operating a robotic system to register unrecognized objects is disclosed. The robotic system may use first image data representative of an unrecognized object to derive an initial minimum viable region (MVR). The robotic system may analyze second image data representative of the unrecognized object to detect a condition representative of an accuracy of the initial MVR. The robotic system may register the initial MVR or an adjustment thereof based on the detected condition.

20 Claims, 15 Drawing Sheets

Related U.S. Application Data

(60) Provisional application No. 62/852,963, filed on May 24, 2019, provisional application No. 62/752,756, filed on Oct. 30, 2018.

(51) Int. Cl.

| | |
|---|---|
| *B25J 9/16* | (2006.01) |
| *G06T 7/73* | (2017.01) |
| *G06T 7/50* | (2017.01) |
| *G06T 7/62* | (2017.01) |
| *B65G 61/00* | (2006.01) |
| *G05B 19/4093* | (2006.01) |
| *G06T 19/20* | (2011.01) |
| *G06T 7/11* | (2017.01) |
| *B65B 43/46* | (2006.01) |
| *G06V 10/25* | (2022.01) |
| *G06V 20/64* | (2022.01) |
| *G06V 10/20* | (2022.01) |
| *G06V 10/44* | (2022.01) |

(52) U.S. Cl.
CPC .............. *G06T 7/50* (2017.01); *G06T 7/62* (2017.01); *G06T 7/73* (2017.01); *G06T 19/20* (2013.01); *G06V 10/25* (2022.01); *G06V 10/255* (2022.01); *G06V 20/64* (2022.01); *G05B 2219/40006* (2013.01); *G05B 2219/40607* (2013.01); *G06T 2200/04* (2013.01); *G06T 2207/10028* (2013.01); *G06T 2207/20164* (2013.01); *G06T 2207/30108* (2013.01); *G06V 10/44* (2022.01)

(56) References Cited

U.S. PATENT DOCUMENTS

| | | | |
|---|---|---|---|
| 6,272,230 B1 | 8/2001 | Hiraoglu et al. | |
| 6,290,454 B1 | 9/2001 | Huang et al. | |
| 7,085,622 B2 | 8/2006 | Sadighi et al. | |
| 7,646,917 B2 | 1/2010 | Jung et al. | |
| 8,571,298 B2 * | 10/2013 | McQueen | G06K 7/10861 |
| | | | 235/462.11 |
| 9,050,719 B2 | 6/2015 | Valpola et al. | |
| 9,067,744 B2 | 6/2015 | Takizawa et al. | |
| 9,102,055 B1 | 8/2015 | Konolige et al. | |
| 9,227,323 B1 | 1/2016 | Konolige et al. | |
| 9,233,470 B1 | 1/2016 | Bradski et al. | |
| 9,272,417 B2 | 3/2016 | Konolige et al. | |
| 9,327,406 B1 * | 5/2016 | Hinterstoisser | B25J 9/1697 |
| 9,486,921 B1 | 11/2016 | Straszheim et al. | |
| 9,630,320 B1 | 4/2017 | Konolige et al. | |
| 9,630,321 B2 * | 4/2017 | Bradski | G06V 20/10 |
| 9,757,858 B2 | 9/2017 | Eto et al. | |
| 9,796,540 B1 | 10/2017 | Shellenbaum et al. | |
| 9,862,093 B2 | 1/2018 | Bradski et al. | |
| 10,124,489 B2 * | 11/2018 | Chitta | B25J 9/1687 |
| 10,147,398 B2 * | 12/2018 | Koga | G06F 3/017 |
| 10,328,578 B2 | 6/2019 | Holz | |
| 10,369,701 B1 | 8/2019 | Diankov et al. | |
| 10,471,597 B1 * | 11/2019 | Murphy | B25J 9/1674 |
| 10,562,188 B1 | 2/2020 | Diankov et al. | |
| 10,562,189 B1 | 2/2020 | Diankov et al. | |
| 10,614,340 B1 | 4/2020 | Yu et al. | |
| 10,625,952 B1 | 4/2020 | Luthra et al. | |
| 10,703,584 B2 | 7/2020 | Diankov et al. | |
| 11,034,025 B2 | 6/2021 | Diankov et al. | |
| 11,062,457 B2 | 7/2021 | Yu et al. | |
| 11,068,679 B2 | 7/2021 | Rodriguez et al. | |
| 11,189,033 B2 | 11/2021 | Yu et al. | |
| 11,288,810 B2 | 3/2022 | Diankov et al. | |
| 2002/0106273 A1 | 8/2002 | Huang et al. | |
| 2007/0177011 A1 | 8/2007 | Lewin et al. | |
| 2007/0177790 A1 | 8/2007 | Ban et al. | |
| 2009/0028686 A1 | 1/2009 | Tallis et al. | |
| 2010/0004778 A1 | 1/2010 | Arimatsu et al. | |
| 2010/0052152 A1 | 3/2010 | Mishra et al. | |
| 2010/0222915 A1 | 9/2010 | Kuehnemann et al. | |
| 2011/0216185 A1 | 9/2011 | Laws et al. | |
| 2011/0218670 A1 | 9/2011 | Bell et al. | |
| 2013/0096713 A1 | 4/2013 | Takizawa et al. | |
| 2013/0211593 A1 | 8/2013 | Domae et al. | |
| 2014/0052555 A1 | 2/2014 | MacIntosh | |
| 2015/0066199 A1 | 3/2015 | Shimono | |
| 2015/0203304 A1 | 7/2015 | Morency et al. | |
| 2015/0262012 A1 | 9/2015 | Kim et al. | |
| 2016/0016311 A1 | 1/2016 | Konolige et al. | |
| 2017/0057146 A1 | 3/2017 | Altonen et al. | |
| 2017/0057148 A1 | 3/2017 | Altonen et al. | |
| 2017/0076469 A1 | 3/2017 | Sonoura et al. | |
| 2017/0137236 A1 | 5/2017 | Sonoura et al. | |
| 2017/0177746 A1 | 6/2017 | Gotou | |
| 2017/0246744 A1 | 8/2017 | Chitta et al. | |
| 2018/0126553 A1 | 5/2018 | Corkum et al. | |
| 2018/0198983 A1 | 7/2018 | Fukuya et al. | |
| 2018/0243904 A1 | 8/2018 | Bradski | |
| 2018/0253516 A1 | 9/2018 | Shimano et al. | |
| 2018/0304468 A1 | 10/2018 | Holz | |
| 2019/0206059 A1 | 7/2019 | Landman | |
| 2020/0130962 A1 | 4/2020 | Yu et al. | |
| 2020/0130963 A1 | 4/2020 | Diankov et al. | |
| 2020/0134828 A1 | 4/2020 | Diankov et al. | |
| 2020/0134830 A1 | 4/2020 | Yu et al. | |
| 2020/0139553 A1 | 5/2020 | Diankov et al. | |
| 2020/0279084 A1 | 9/2020 | Davis et al. | |
| 2020/0294244 A1 | 9/2020 | Diankov et al. | |
| 2020/0302207 A1 | 9/2020 | Perkins et al. | |
| 2021/0129334 A1 | 5/2021 | Kanunikov et al. | |
| 2021/0158609 A1 | 5/2021 | Raskob et al. | |
| 2021/0260771 A1 | 8/2021 | Diankov et al. | |
| 2021/0304416 A1 | 9/2021 | Yu et al. | |
| 2022/0076425 A1 | 3/2022 | Yu et al. | |
| 2022/0292278 A1 | 9/2022 | Roberts et al. | |
| 2023/0008540 A1 | 1/2023 | Diankov et al. | |
| 2023/0041343 A1 | 2/2023 | Yu et al. | |

FOREIGN PATENT DOCUMENTS

| | | |
|---|---|---|
| CN | 1791475 A | 6/2006 |
| CN | 102616578 A | 8/2012 |
| CN | 103568024 A | 2/2014 |
| CN | 103822594 A | 5/2014 |
| CN | 104608150 A | 5/2015 |
| CN | 103043359 A | 7/2015 |
| CN | 105817430 A | 8/2016 |
| CN | 106063998 A | 11/2016 |
| CN | 106660207 A | 5/2017 |
| CN | 106886165 A | 6/2017 |
| CN | 106945035 A | 7/2017 |
| CN | 107889452 A | 4/2018 |
| CN | 108349083 A | 7/2018 |
| CN | 111566028 A | 8/2020 |
| CN | 111629868 A | 9/2020 |
| DE | 102014016069 A1 | 5/2015 |
| DE | 102015106936 A2 | 11/2015 |
| JP | 03234491 A | 10/1991 |
| JP | H03234491 A | 10/1991 |
| JP | H06171760 A | 6/1994 |
| JP | 07053054 A | 2/1995 |
| JP | 2007097057 A | 4/1995 |
| JP | H0797057 A | 4/1995 |
| JP | H07291450 A | 11/1995 |
| JP | 10031742 A | 2/1998 |
| JP | 2894449 B2 | 5/1999 |
| JP | 2001058723 A | 3/2001 |
| JP | 2001072247 A | 3/2001 |
| JP | 2002013913 A | 1/2002 |
| JP | 3277739 A | 4/2002 |
| JP | 2003237943 A | 8/2003 |
| JP | 2004050390 A | 2/2004 |
| JP | 3596434 B2 | 12/2004 |
| JP | 3849514 B2 | 11/2006 |
| JP | 2006300929 A | 11/2006 |
| JP | 2007254128 A | 10/2007 |

(56) References Cited

FOREIGN PATENT DOCUMENTS

| JP | 2010247959 A | 11/2010 |
|---|---|---|
| JP | 2013129034 A | 7/2013 |
| JP | 5429614 B2 | 2/2014 |
| JP | 2017058130 A | 3/2017 |
| JP | 2017520418 A | 7/2017 |
| JP | 2017149569 A | 8/2017 |
| JP | 2018047544 A | 3/2018 |
| JP | 6374993 B2 | 8/2018 |
| JP | 6461712 B2 | 1/2019 |
| JP | 2019005871 A | 1/2019 |
| JP | 6486114 B2 | 3/2019 |
| JP | 2019509559 A | 4/2019 |
| JP | 2019136828 A | 8/2019 |
| JP | 2021507857 A | 2/2021 |
| WO | 2017146895 A1 | 8/2017 |
| WO | 2018185861 A1 | 10/2018 |

OTHER PUBLICATIONS

Notice of Allowance dated Jun. 7, 2019 for U.S. Appl. No. 16/290,741, filed Mar. 1, 2019, 8 pages.
Non-Final Office Action dated Jul. 12, 2019 for U.S. Appl. No. 16/443,743, filed Jun. 17, 2019, 11 pages.
Notice of Allowance dated Oct. 9, 2019 for U.S. Appl. No. 16/443,743, filed Jun. 17, 2019, 12 pages.
Non-Final Office Action dated Jul. 15, 2019 for U.S. Appl. No. 16/443,757, filed Jun. 17, 2019, 12 pages.
Notice of Allowance dated Oct. 7, 2019 for U.S. Appl. No. 16/443,757, filed Jun. 17, 2019, 12 pages.
Non-Final Office Action dated Nov. 14, 2019 for U.S. Appl. No. 16/539,790, filed Aug. 13, 2019, 16 pages.
Korean Intellectual Property Office, International Application Division, International Search Report and Written Opinion for PCT/US2019/035608 filed Jun. 5, 2018, dated Aug. 29, 2019, 9 pages.
Japanese Patent Office, Notice of Reasons for Rejection for Japanese Application No. 2019-133517, dated Nov. 18, 2019, with English translation, 6 pages.
International Search Report and Written Opinion dated Feb. 19, 2020 for PCT/US2019/058672 filed Oct. 29, 2019, ISA/KR, 10 pages.
International Search Report and Written Opinion dated Feb. 17, 2020 for PCT/US2019/058650 filed Oct. 29, 2019, ISA/KR, 12 pages.
International Search Report and Written Opinion dated Feb. 19, 2020 for PCT/US2019/058656 filed Oct. 29, 2019, ISA/KR, 9 pages.
International Search Report and Written Opinion dated Feb. 20, 2020 for PCT/US2019/058666 filed Oct. 29, 2019, ISA/KR, 10 pages.
International Search Report and Written Opinion dated Feb. 24, 2020 for PCT/US2019/058677 filed Oct. 29, 2019, ISA/KR, 9 pages.
Notice of Allowance dated Mar. 9, 2020 for U.S. Appl. No. 16/539,790, filed Aug. 13, 2019, 19 pages.
Jia, Tong et al., "Depth Measurement Based on Infrared Coded Structured Light," Hindawi Publishing Corporation, Journal of Sensors, vol. 2014, Article ID 852261, 8 pages, published Oct. 19, 2014.
Japanese Patent Office, Decision to Grant Japanese Application No. 2019-133517, dated Mar. 17, 2020, 3 pages.
Japanese Patent Office, Notice of Reasons for Rejection for Japanese Application No. 2020-516651, dated Nov. 9, 2020, with English translation, 6 pages.
Japanese Patent Office, Notice of Reasons for Rejection for Japanese Application No. 2020-515142, dated Nov. 9, 2020, with English translation, 13 pages.
Japanese Patent Office, Notice of Reasons for Rejection for Japanese Application No. 2020-514759, dated Oct. 28, 2020, with English translation, 6 pages.
Japanese Patent Office, Decision to Grant Japanese Application No. 2020-514759, dated Nov. 27, 2020, 3 pages.
Japanese Patent Office, Notice of Reasons for Rejection for Japanese Application No. 2020-514750, dated Oct. 28, 2020, with English translation, 7 pages.
Japanese Patent Office, Decision to Grant Japanese Application No. 2020-514750, dated Nov. 27, 2020, 3 pages.
Japanese Patent Office, Notice of Reasons for Rejection for Japanese Application No. 2020-501166, dated Oct. 28, 2020, 2 pages.
Japanese Patent Office, Decision to Grant Japanese Application No. 2020-501166, dated Nov. 12, 2020, 3 pages.
CIPO Office Action dated Jul. 2, 2020 for Application No. 201910597137.2, 5 pages.
CIPO Office Action dated Jan. 7, 2021 for Application No. 201910597137.2, 3 pages.
Japanese Patent Office, Decision to Grant Japanese Application No. 2020-516651, dated Dec. 2, 2020, 3 pages.
Japanese Patent Office, Decision to Grant Japanese Application No. 2020-515142, dated Dec. 7, 2020, 3 pages.
CIPO Office Action dated Feb. 23, 2021 for Application No. 202010416747.0, 6 pages.
Notice of Allowance dated Feb. 10, 2021 for U.S. Appl. No. 16/736,667, filed Jan. 7, 2020, First Inventor: Rosen Diankov, 23 pages.
CIPO Office Action dated Mar. 3, 2021 for Application No. 202010482376.6, 11 pages.
German Patent Office Office Action dated Nov. 18, 2020 for Application No. 112019000125.6, 7 pages.
CIPO Notice to Grant dated Apr. 7, 2021 for Application No. 201910597137.2, 4 pages.
CIPO Office Action dated Apr. 2, 2021 for Application No. 202010482364.3, 9 pages.
CIPO Office Action dated Apr. 28, 2021 for Application No. 202010539908.5, 12 pages.
CIPO Office Action dated Mar. 19, 2021 for Application No. 202010539927.8, 7 pages.
CIPO Notice to Grant dated Apr. 13, 2021 for Application No. 202010416747.0, 4 pages.
German Patent Office Decision to Grant dated Mar. 16, 2021 for Application No. 112019000125.6, 6 pages.
Notice of Allowance dated Mar. 26, 2021 for U.S. Appl. No. 16/667,822, filed Oct. 29, 2019, 27 pages.
Holz et al., Fast Edge-Based Detection and Localization of Transport Boxes and Pallets in RGB-D Images for Mobile Robot Bin Picking, ISR 2016, Jun. 21-22, 2016, Munich, Germany, pp. 133-140, Year: 2016.
Holz et al., "Real-Time Object Detection, Localization and Verification of Fast Robotic Depalletizing," 978-1-4799-9994-1, IEEE 2015, pp. 1459-1466, Year: 2015.
Doliotis et al., "A 3D Perception-based Robotic Manipulation System for Automated Truck Unloading," 978-1-5090-2409-4, IEEE 2016, pp. 262-267, Year: 2016.
Non-Final Office Action dated Apr. 13, 2021 for U.S. Appl. No. 16/667,882, filed Oct. 29, 2019, 23 pages.
CIPO Notice to Grant dated May 20, 2021 for Application No. 202010539927.8, 4 pages.
International Bureau of WIPO, PCT International Preliminary Report on Patentability for PCT/US2019/035608 filed Jun. 5, 2019, dated May 14, 2021, 6 pages.
International Bureau of WIPO, PCT International Preliminary Report on Patentability for PCT/US2019/058672 filed Oct. 29, 2019, dated May 14, 2021, 7 pages.
International Bureau of WIPO, PCT International Preliminary Report on Patentability for PCT/US2019/058650 filed Oct. 29, 2019, dated May 14, 2021, 9 pages.
International Bureau of WIPO, PCT International Preliminary Report on Patentability for PCT/US2019/058656 filed Oct. 29, 2019, dated May 14, 2021, 6 pages.
International Bureau of WIPO, PCT International Preliminary Report on Patentability for PCT/US2019/058666 filed Oct. 29, 2019, dated May 14, 2021, 7 pages.

(56) References Cited

OTHER PUBLICATIONS

International Bureau of WIPO, PCT International Preliminary Report on Patentability for PCT/US2019/058677 filed Oct. 29, 2019, dated May 14, 2021, 6 pages.

CIPO Notice to Grant dated May 21, 2021 for Application No. 202010482376.6, 4 pages.

CIPO Notice to Grant dated Jul. 2, 2021 for Application No. 202010539908.5, 4 pages.

Notice of Allowance dated Jun. 2, 2021 for U.S. Appl. No. 16/667,822, filed Oct. 29, 2019, 20 pages.

Non-Final Office Action dated Jul. 21, 2021 for U.S. Appl. No. 16/888,376, filed May 29, 2020, 40 pages.

Notice of Allowance dated Jul. 29, 2021 for U.S. Appl. No. 16/667,840, filed Oct. 29, 2019, 35 pages.

Notice of Allowance dated Jul. 2, 2021 for U.S. Appl. No. 16/667,882, filed Oct. 29, 2019, 18 pages.

CIPO Notice to Grant dated Jun. 15, 2021 for Application No. 202010482364.3, 4 pages.

Notice of Allowance dated Nov. 5, 2021 for U.S. Appl. No. 16/888,376, filed May 29, 2020, 13 pages.

German Patent Office Office Action dated Mar. 16, 2022 for Application No. 112019000217.1, 8 pages.

Notice of Allowance dated Jun. 7, 2022 for U.S. Appl. No. 16/667,857, filed Oct. 29, 2019, 39 pages.

Non-Final Office Action dated Dec. 12, 2022 for U.S. Appl. No. 17/313,921, filed May 6, 2021, First Named Inventor: Rosen Diankov, 20 pages.

Notice of Allowance dated Dec. 16, 2022 for U.S. Appl. No. 17/344,720, filed Oct. 29, 2019, 16 pages.

Japanese Patent Office, Notice of Reasons for Rejection dated Jul. 22, 2022 for Application No. 2022-097954, Applicant: MUJIN, Inc., 14 pages.

Japanese Patent Office, Notice of Reasons for Rejection dated Aug. 25, 2022 for Application No. 2022-097954, Applicant: MUJIN, Inc., 8 pages.

Japanese Patent Office, Decision to Grant Japanese Application No. 2022-097954, dated Oct. 4, 2022, 3 pages.

Kyle O. Logan, Non-Final Office Action dated Mar. 30, 2023 for U.S. Patent Application No. 17944, 117 filed Sep. 13, 2022, First Named Inventor: Rosen Nikolaev Diankov, 12 pages.

Yolanda Renee Cumbess, Non-Final Office Action dated May 11, 2023 for U.S. Appl. No. 17/527,012, filed Nov. 15, 2021, First Named Inventor: Jinze Yu, 22 pages.

\* cited by examiner

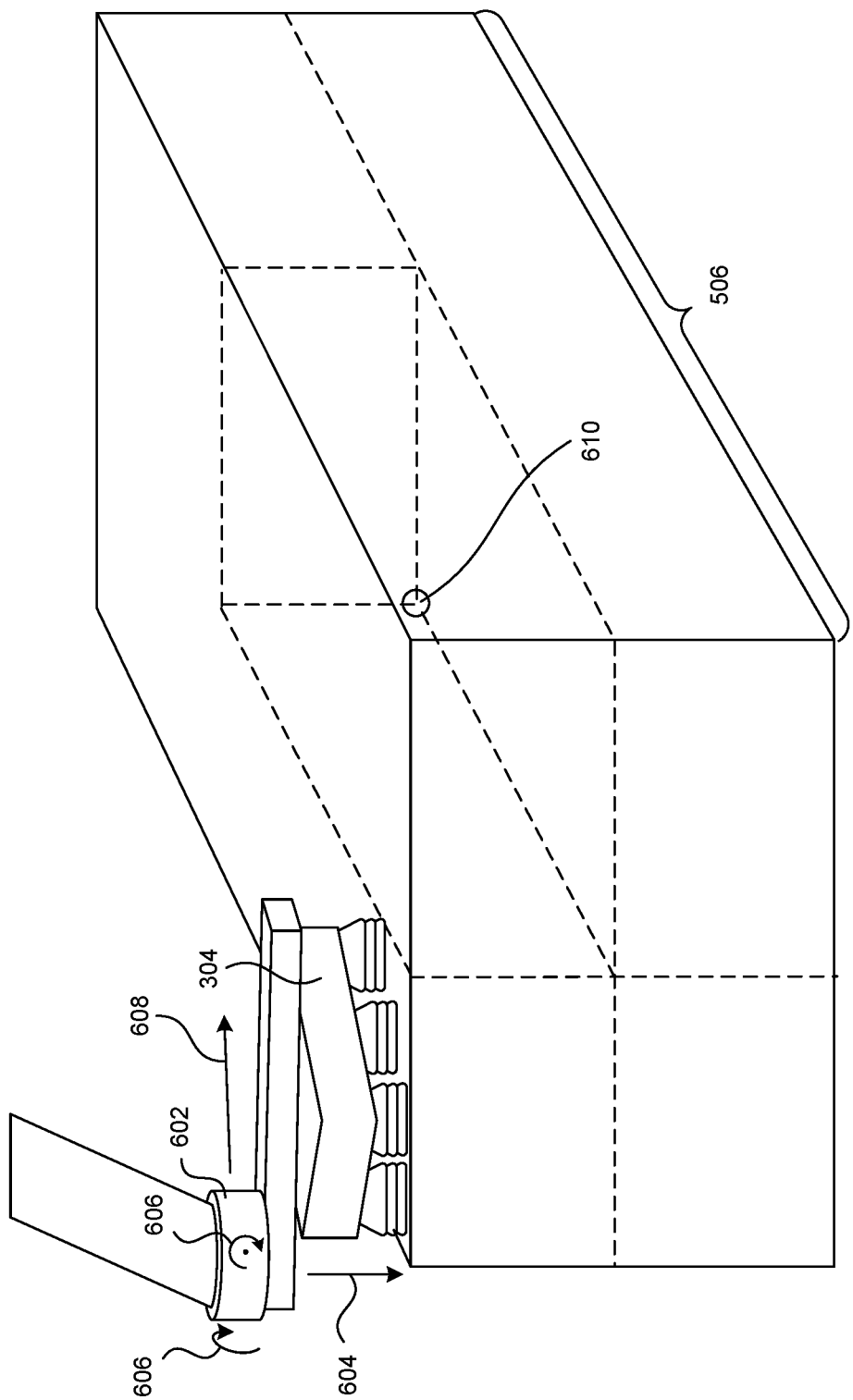

ROBOTIC SYSTEM WITH AUTOMATED OBJECT DETECTION MECHANISM AND METHODS OF OPERATING THE SAME

CROSS-REFERENCE TO RELATED APPLICATION(S)

This application is a continuation of U.S. patent application Ser. No. 16/667,882, filed Oct. 29, 2019, now allowed, which claims the benefit of U.S. Provisional Patent Application Ser. No. 62/752,756, filed Oct. 30, 2018, and further claims the benefit of U.S. Provisional Patent Application Ser. No. 62/852,963, filed May 24, 2019, all of which are incorporated by reference herein in their entirety. This application is also related to U.S. patent application Ser. No. 16/290,741, filed Mar. 1, 2019, now U.S. Pat. No. 10,369,701, and U.S. patent application Ser. No. 16/539,790, filed Aug. 13, 2019, now U.S. Pat. No. 10,703,584, both of which are incorporated herein by reference in their entirety.

TECHNICAL FIELD

The present technology is directed generally to robotic systems and, more specifically, to systems, processes, and techniques for detecting objects.

BACKGROUND

Often times, packages are palletized for shipment to a destination where they are de-palletized. Sometimes, they are de-palletized by human workers which can be expensive and risks bodily injuries. In industrial settings, de-palletizing operations are often performed by industrial robots such as a robotic arm that grips, lifts, transports, and delivers the package to a release point. Also, an imaging device may be employed to capture an image of a stack of packages loaded on the pallet. A system may process the image to ensure the package is efficiently handled by the robotic arm, such as by comparing the captured image with a registered image stored in a registration data source.

On occasion, the captured image of a package may match a registered image. As a result, physical characteristics (e.g., measurements of a package's dimensions, weight, and/or center or mass) of the imaged objects may be known. Failure to correctly identify the physical characteristics can lead to a variety of unwanted outcomes. For example, such failure could cause a stoppage, which may require manual registration of the package. Also, such failure could result in a package being mishandled, especially if the package is relatively heavy and/or lop-sided.

BRIEF DESCRIPTION OF THE DRAWINGS

FIG. 6 is an illustration of an object after an initial-lift maneuver in accordance with one or more embodiments of the present technology.

DETAILED DESCRIPTION

Figure 1:
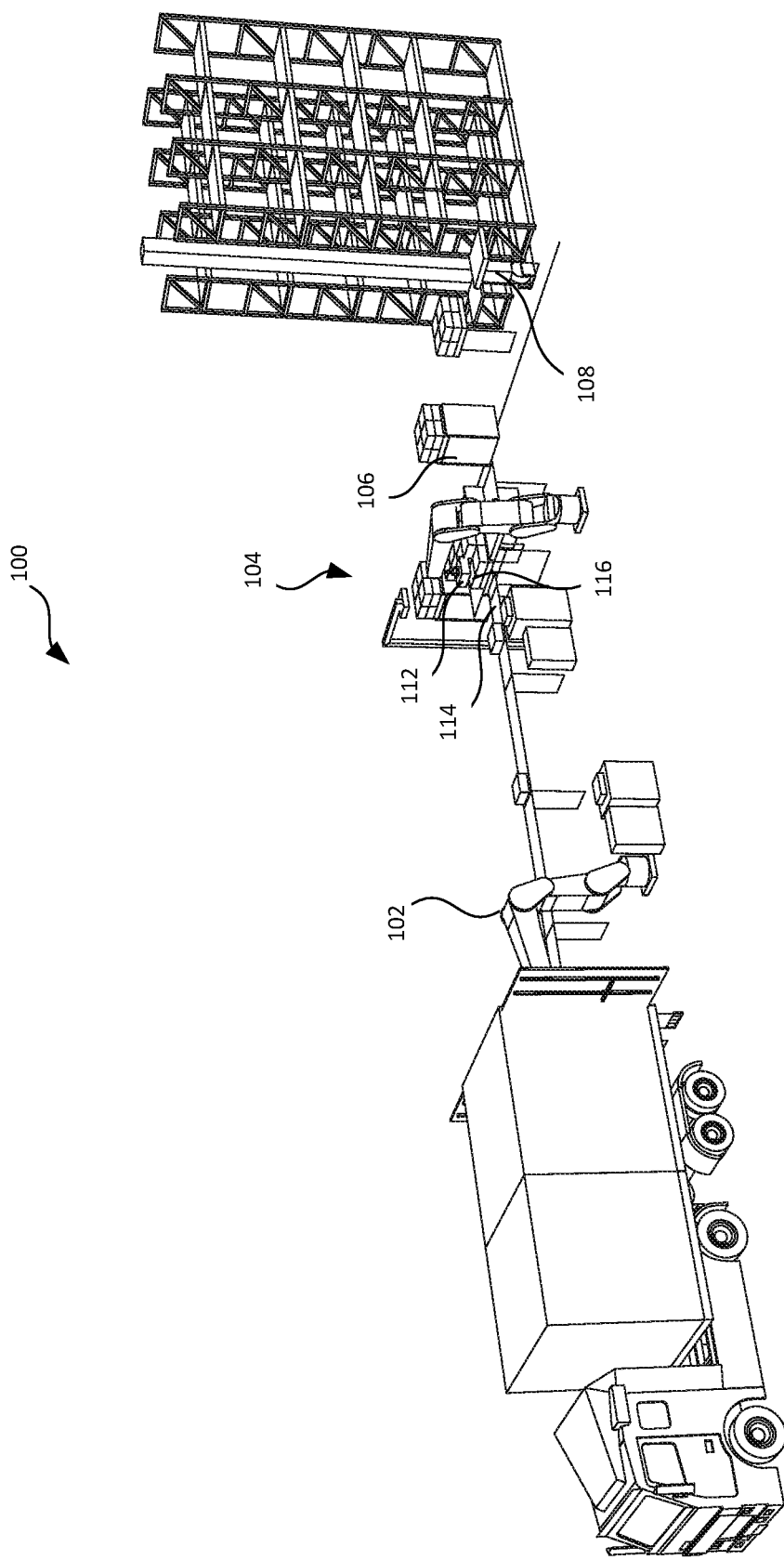
FIG. 1 is an illustration of an example environment in which a robotic system with an object detection mechanism may operate.

Systems and methods for robotic systems with automated object detection/registration mechanisms are described herein. A robotic system (e.g., an integrated system of devices that executes one or more designated tasks) configured in accordance with some embodiments provides enhanced usability and flexibility by autonomously/automatically (e.g., with little or no human-operator inputs) detecting and registering previously unknown or unrecognized objects (e.g., packages, boxes, cases, etc.).

To determine whether objects are recognized, the robotic system can obtain and compare data regarding objects at a start location (e.g., one or more images of exposed surfaces of the objects) to registration data for known or expected objects. The robotic system can detect that one or more recognized/registered objects are at the start location when the compared data (e.g., a portion of the compared image) matches registration data (e.g., one of the registered surface images) for one of the corresponding objects represented therein. The robotic system can determine one or more unmatched portions in the image data (e.g., portions of the image that fails to match the registration data of known or expected objects) based on removing the portions that match the registration data. The robotic system can determine that the unexplained region includes one or more unrecognized objects.

As described in detail below, the robotic system can manipulate the unrecognized objects according to one or more estimations and determine additional information (e.g., a surface image and/or physical dimensions) about the unrecognized objects. For example, the robotic system can identify exposed edges and/or exposed outer corners of the unrecognized objects that are separate or non-adjacent to other objects/surfaces. In one or more embodiments, the robotic system can identify the exposed edges and/or the exposed outer corners for the unrecognized objects that are located at corners on the target stack and/or protrude relative to other objects located on a common layer (e.g., objects with exposed surfaces having heights within a threshold range from each other). Based on the exposed edges and/or the exposed outer corners the robotic system can derive minimum viable regions (MVRs) on the exposed surfaces. The MVRs can each represent an area required to contact and lift the corresponding objects and/or an estimate of a surface for one of the unrecognized objects. The robotic system can grip the unrecognized object based on the MVR and perform an initial lift, thereby separating (e.g., vertically and/or horizontally) previously unclear edges from adjacent objects/surfaces.

After the initial lift, the robotic system can obtain and process comparison data (e.g., sensor data representing the unrecognized objects after the initial lift) to identify new information regarding the unrecognized objects. For example, the robotic system can process the comparison data to identify newly discovered (e.g., previously uncertain) edges and/or corners, associated measurements (e.g., dimensions of the objects), updated images/depth maps, or a combination thereof for the unrecognized objects. The robotic system can store the new information in the master data to autonomously/automatically register ("auto-register") the previously unrecognized objects. Accordingly, the robotic system can use the auto-registration data to identify, process, and/or manipulate same type of objects.

In registering the data, the robotic system can update the MVRs and store them each as a representation of a surface for one unrecognized object. The robotic system can update the MVRs based on cropping identified portions from an initial image data (e.g., before the initial lift) and/or combining portions across multiple image data according to processing results of a comparison data (e.g., image taken after the initial lift). Accordingly, the robotic system can generate and register updated data. Some examples of the processing results include occlusion estimates and/or edge lengths. Using the occlusion estimates, the robotic system can determine portions of the image data that depict structures other than the objects, such as portions of robotic units, and/or portions of the image data altered by lifting/moving one or more objects. Using the edge lengths, the robotic system can compensate for deformations in the objects (e.g., due to object weight, separation between gripping location and center-of-mass (CoM), and/or other changes to the gripped surface) and/or movement of other adjacent objects.

Accordingly, the robotic system can obtain various data regarding the previously unrecognized objects and use it to autonomously generate corresponding registration data and update the master data. The generated registration data can include surface images, dimensions (including the object height), and/or other physical characteristics of the corresponding object. Thus, the robotic system can register objects autonomously (e.g., without human operator input) and use the registered data to recognize and process subsequent instances of the same type of object.

Further, using the autonomous registration, the robotic system can process (e.g., transfer, pack, unpack, etc.) the unrecognized objects without operator assistance. Accordingly, the overall operations of the robotic system can continue uninterrupted even when objects are unrecognized objects. Also, the MVR processing increases the accuracy in estimating surfaces of each object, which increases the accuracy in detecting the individual objects and capturing surfaces images of the detected unrecognized objects.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with an object detection mechanism may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (by, e.g., operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Suitable System

Figure 2:
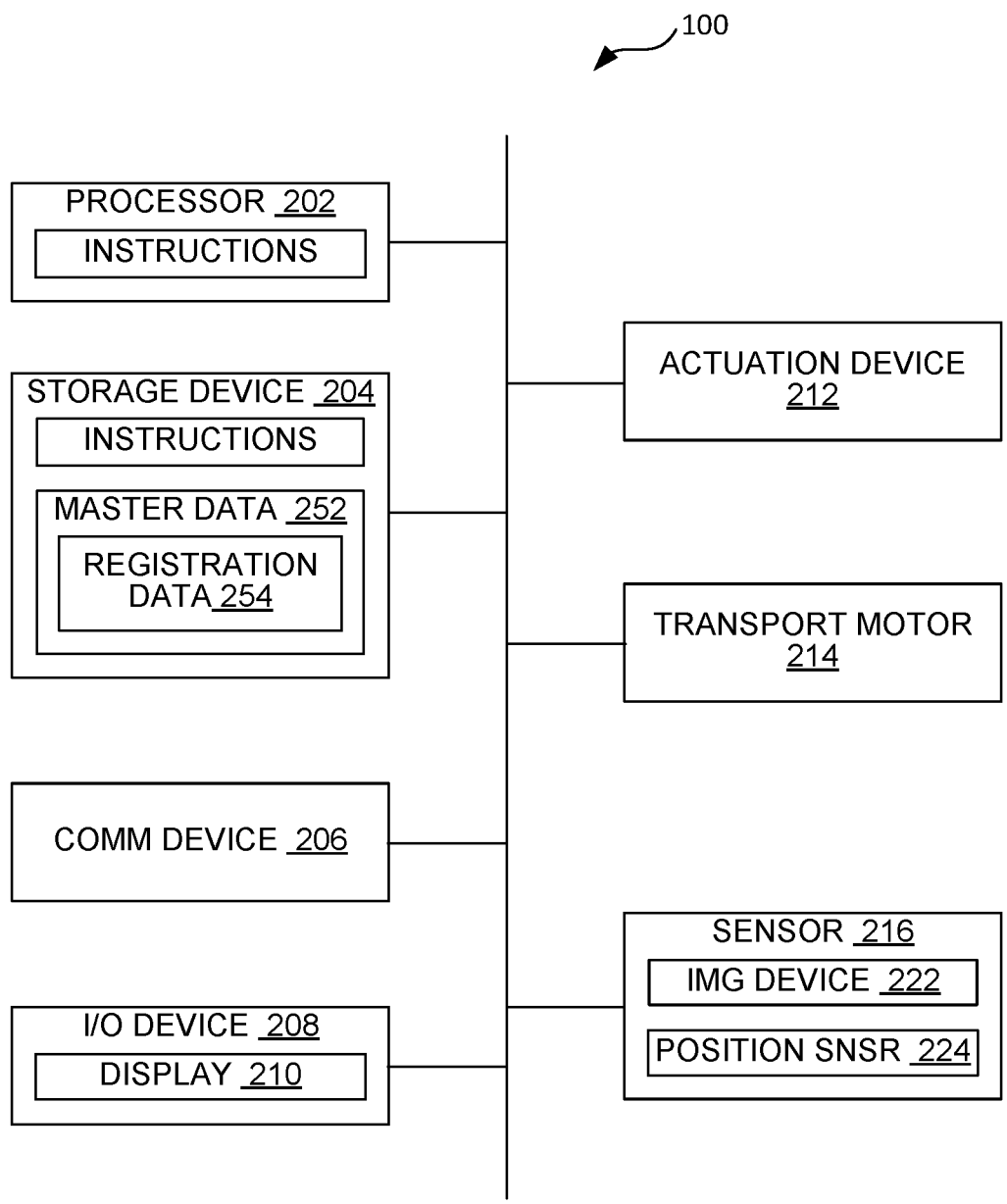
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include registration data 254 for each such object. The registration data 254 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location or an estimate thereof on each of the objects, expected sensor measurements (e.g., for force, torque, pressure, and/or contact measurements) corresponding to one or more actions/maneuvers, or a combination thereof.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Example Object Transfer and Registration

Figure 3:
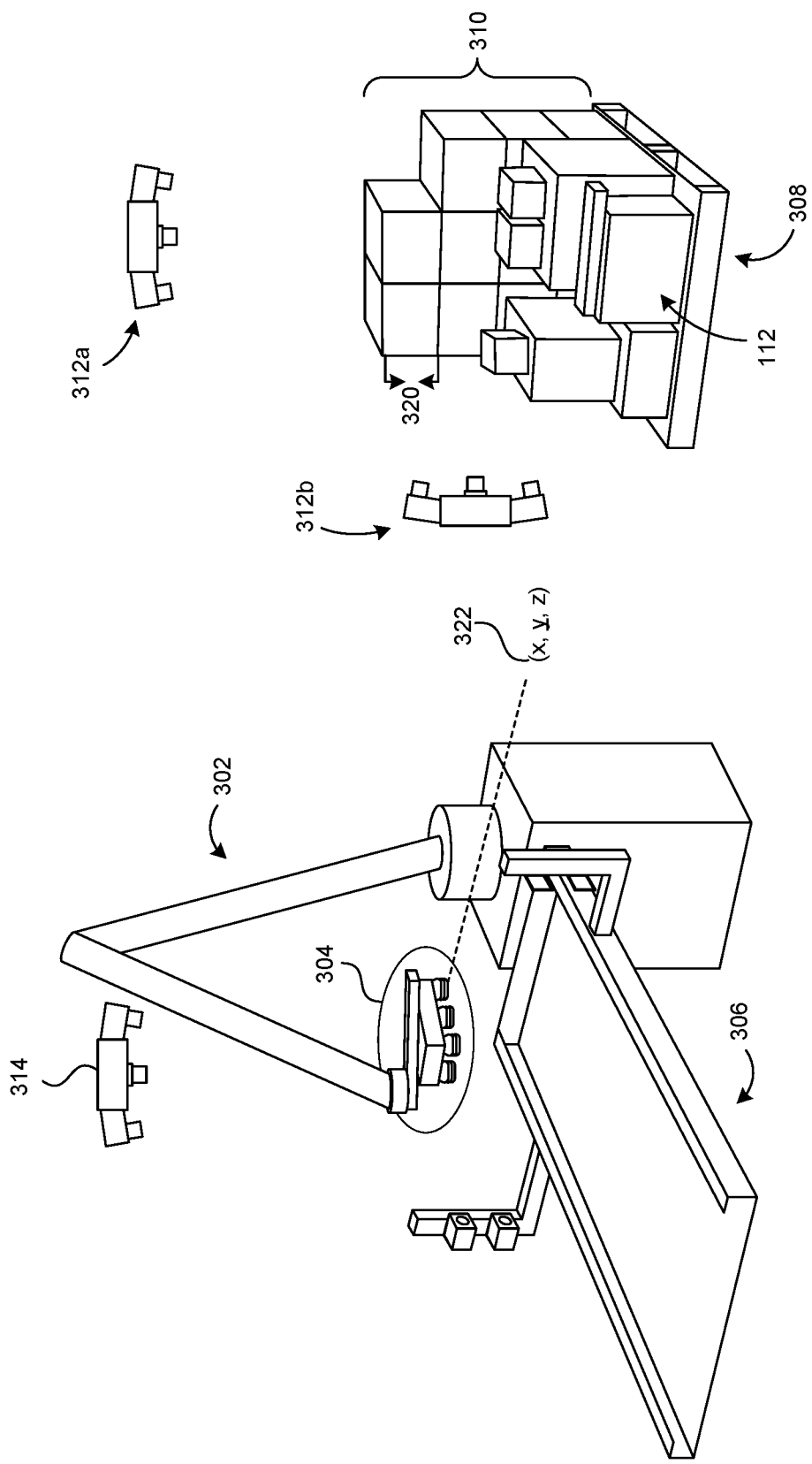
FIG. 3 is an illustration of the robotic system in accordance with one or more embodiments of the present technology.

FIG. 3 is an illustration of the robotic system 100 of FIG. 1 in accordance with one or more embodiments of the present technology. The robotic system 100 can include a robotic arm 302 (e.g., an instance of the transfer unit 104 of FIG. 1) that includes an end-effector 304 (e.g., a gripper). The robotic arm 302 can be configured to transfer the target object 112 between the start location 114 of FIG. 1 and the task location 116 of FIG. 1. As illustrated in FIG. 3, the start location 114 can have a pallet 308 with a target stack 310 (e.g., a grouping of objects) thereon. The task location 116 for the robotic arm 302 can be a placement location (e.g., a starting/egress point) on a conveyor 306 (e.g., an instance of the transport unit 106 of FIG. 1). For example, the robotic arm 302 can be configured to pick the objects from the target stack 310 and place them on the conveyor 306 for transport to another destination/task.

The robotic system 100 can use one or more of the sensors 216 of FIG. 2 in performing the transfer operation with the robotic arm 302. In some embodiments, the robotic system 100 can include a first imaging sensor 312 and/or a second imaging sensor 314. The first imaging sensor 312 can include one or more 2D and/or 3D sensors, such as cameras and/or depth sensors, configured to image and/or analyze the start location 114. The second imaging sensor 314 can include one or more 2D and/or 3D sensors, such as cameras and/or depth sensors, configured to image and/or analyze the task location 116. For example, the first imaging sensor 312 can include one or more top-view sensors 312a (e.g., cameras and/or depth sensors) located at a known location above and facing the start location 114. The top-view sensors 312a can generate imaging data corresponding to one or more top views of the start location 114, such as a top view of the target stack 310. Optionally, the first imaging sensor 312 can further include one or more side-view sensors 312b (e.g., cameras and/or depth sensors) located at a known location laterally next to the start location 114 and facing the start location 114 and/or a space directly above it. The side-view sensors 312b generate imaging data corresponding to one or more side/profile views of the start location 114, such as a side/profile view of the target stack 310. Also, the second imaging sensor 314 can include one or more cameras and/or depth sensors located at one or more known locations above/lateral to and facing the task location 116 or an associated space. Accordingly, the second imaging sensor 314 can generate imaging data corresponding to one or more top and/or optional side views of the target object 112 at or within a threshold distance from the task location 116.

The robotic system 100 can use the first imaging sensor 312 to identify objects located at the start location. As described in detail below, the robotic system 100 can analyze the image data from the first imaging sensor 312 to identify existence of each objects and/or their locations at/about the start location. The robotic system 100 can further analyze the image data to determine whether or not the objects match previously registered objects (e.g., objects corresponding to the registration data 254 of FIG. 2 and/or other aspects of the master data 252 of FIG. 2). The robotic system 100 can use the image data to estimate a surface (e.g., a top-horizontal surface and/or a peripheral-vertical surface) of each of the objects, such as by deriving a minimum viable region (MVR). The robotic system 100 can use the MVR to register an unrecognized object (by, e.g., storing the MVR and/or a processing result thereof for a new instance of the registration data 254 that represents the unrecognized object). The updated registration data can be used to recognize subsequent instances of the unrecognized object.

The robotic system 100 can use the image data from the first imaging sensor 312 and/or the second imaging sensor 314 to perform tasks, such as for transferring the objects from the start location 114 to the task location 116. Accordingly, the robotic system 100 can use the image data to derive and implement one or more motion plans to perform the tasks. The robotic system 100 can further use the image data form the second imaging sensor 314 to adjust or deviate from the motion plans and/or obtain additional data about the object during transfer.

Object Recognition

Figure 4A:
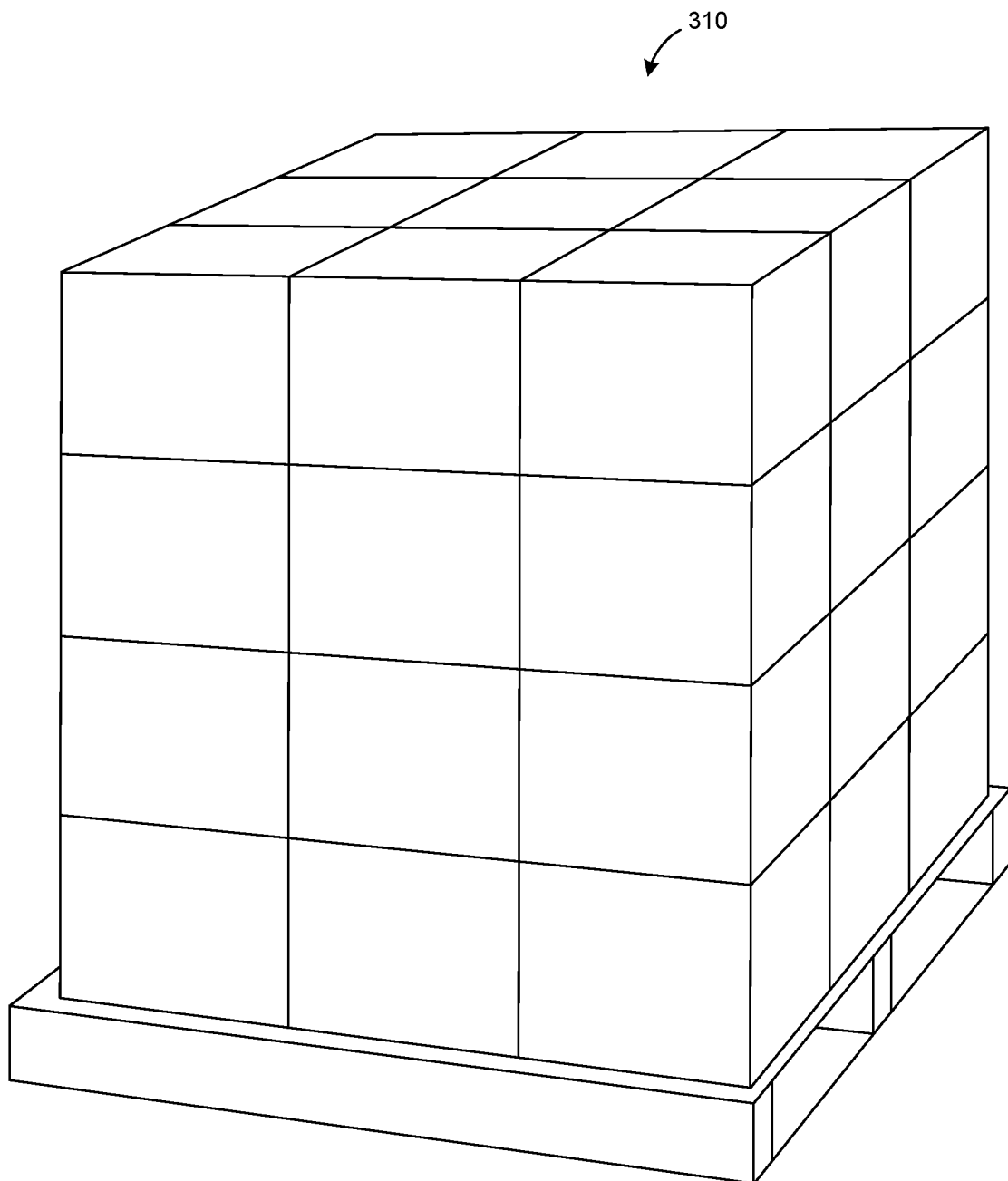
FIG. 4A is an illustration of an example stack of objects processed by the robotic system in accordance with one or more embodiments of the present technology.
Figure 4B:
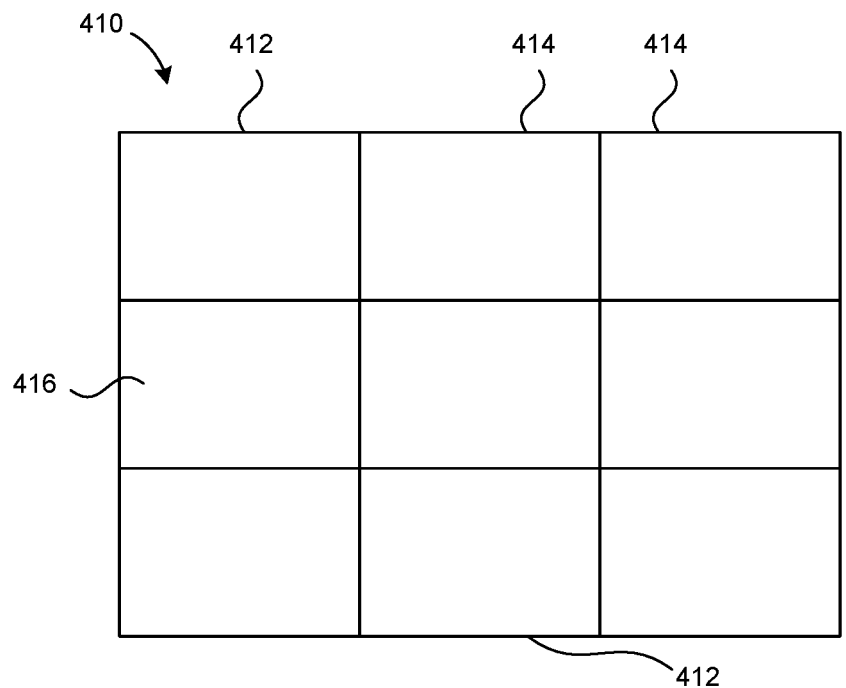
FIG. 4B is an illustration of a top surface of the example stack in accordance with one or more embodiments of the present technology.
Figure 4C:
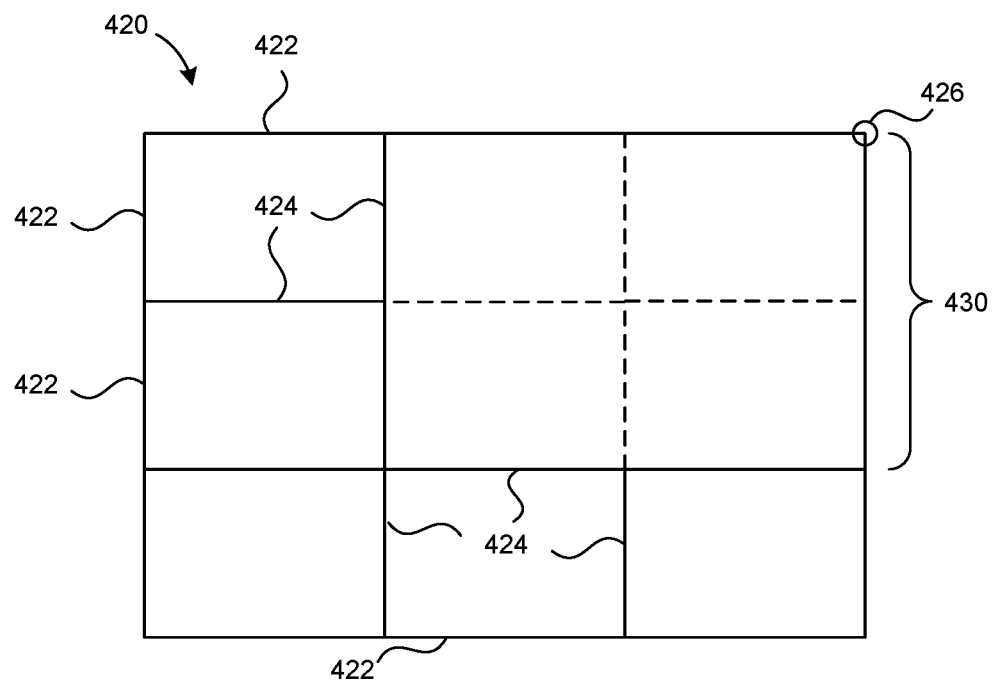
FIG. 4C is an illustration of sensor data corresponding to the top surface in accordance with one or more embodiments of the present technology.

FIG. 4A is an illustration of an example stack of objects (e.g., the target stack 310 of FIG. 3) processed by the robotic system 100 of FIG. 1; FIG. 4B is an illustration of a top surface of the example stack (e.g., an actual top view 410 of the target stack 310); and FIG. 4C is an illustration of sensor data (e.g., top view data 420) corresponding to the top surface, all in accordance with one or more embodiments of the present technology. Referring to FIGS. 4A, 4B, and 4C together, the top view data 420 can include one or more visual images and/or one or more 3D depth maps that depict or represent the actual top view 410.

The robotic system 100 can use image data (e.g., the top view data 420) from the first imaging sensor 312 of FIG. 3 that is located above the target stack 310 for various purposes. The robotic system 100 can analyze the top view data 420 to identify edges that may correspond to object boundaries. For example, the robotic system 100 can identify edges and/or continuous surfaces represented in the image data based on differences in depth measurements and/or image traits (e.g., different colors, linear patterns, shadows, differences in clarity, etc.). Also, the robotic system 100 can identify exposed edges 422 (e.g., edges of object top surfaces that are not horizontally abutting another object/surface at substantially the same height), such as based on differences in the depth measurements.

The target stack 310 may include objects registered in the master data 252 of FIG. 2 and/or unexpected objects not registered in the master data 252. As such, the robotic system 100 can use the image data that corresponds to object surfaces 416 to recognize or identify the objects that are within the target stack 310. In some embodiments, the robotic system 100 can compare the image data or one or more portions therein to the master data 252 (e.g., the various registration data 254 of FIG. 2 therein corresponding to the object surfaces 416) to recognize the objects within the target stack 310. For example, the robotic system 100 can identify the known/registered objects (e.g., recognized objects 412) within the target stack 310 when a portion of the top view data 420 matches one or more images/features of the object surfaces 416 in the registration data 254. The remaining portions of the actual top view 410 (e.g., portions not matching the registration data 254) can be unmatched portions 430 correspond to unrecognized objects 414. The actual edges of the unrecognized objects 414, which may or may not be detectable in the image data, are shown using dashed lines in FIG. 4C.

Based on matching the image data, the robotic system 100 can locate the recognized objects 412 within the top view data 420, which can be further translated (via, e.g., precalibrated table and/or equations that map pixel locations to a coordinate system) to real-world locations for the target stack 310. Further, the robotic system 100 can estimate locations of non-exposed edges of the recognized objects 412 based on the match. For example, the robotic system 100 can obtain dimensions of the recognized objects 412 from the master data 252. The robotic system 100 can measure portions of the image data that is separated by the known dimensions from the exposed edges 422 of the recognized objects 412. According to the mapping, the robotic system 100 can determine one or more registration-based edges 424 for the recognized objects 412 and/or similarly map the registration-based edges 424 to real-world locations similarly as described above.

In some embodiments, the robotic system 100 can identify exposed outer corners 426 of the target stack 310 as represented in the image data. For example, the robotic system 100 can identify the exposed outer corners 426 based on identifying intersections/junctions between two or more of the exposed edges 422 having different orientations (e.g., extending at different angles). In one or more embodiments, the robotic system 100 can identify the exposed outer corners 426 when the exposed edges 422 form an angle that is within a predetermined range, such as for a threshold range about 90°. As described in detail below, the robotic system 100 can use the exposed outer corners 426 and the corresponding exposed edges 422 to process and/or manipulate the unrecognized objects 414.

As an illustrative example, the robotic system 100 can analyze the top view data 420 (e.g., the 3D depth map) perform segmentation, such as by identifying layers/surfaces. The robotic system 100 can identify the layers as groupings of adjacent lateral locations that have depth measures within a threshold range from each other (e.g., for flat surfaces). The robotic system 100 can further identify angled surfaces as groupings of adjacent lateral locations that have depth measures that follow linear patterns/slopes across one or more horizontal directions. The robotic system 100 can also analyze the top view data 420 to identify 3D edges/corners. For example, the robotic system 100 can identify peripheral boundaries of the layers/surfaces as the 3D edges and identify junctions between the 3D edges as 3D corners. Also, the robotic system 100 can identify edges/corners based on detecting changes in color, brightness, and/or visual patterns associated with the changes. In some embodiments, the robotic system 100 can use Sobel filters to identify the edges/corners. Using the identified layers, surfaces, edges, and/or corners, the robotic system 100 can estimate existence location and/or boundaries for each object that may be represented in the top view data 420. In some embodiments, the robotic system 100 can iteratively process the top view data 420 based on deriving and verifying estimates of surfaces, removing verified/registered/certain object surfaces, and/or manipulating estimated objects.

Processing of Unrecognized Objects

Figure 5A:
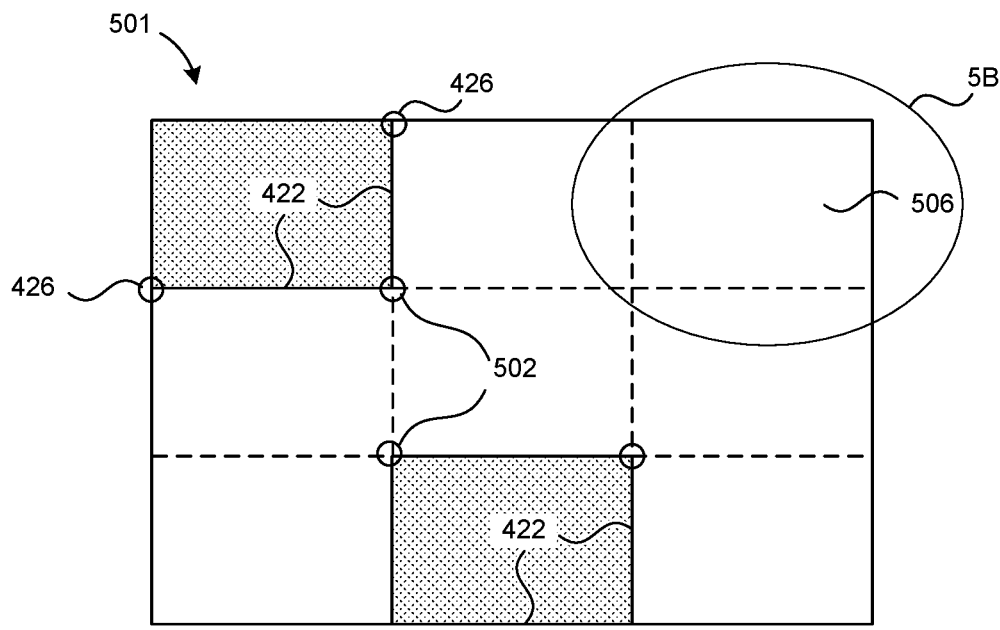
FIG. 5A is an illustration of sensor data corresponding to a top surface following an initial set of operations in accordance with one or more embodiments of the present technology.

In some embodiments, the robotic system 100 can process (e.g., detect and/or transfer) the objects according to recognition status and/or relative locations of the objects within the target stack 310. For example, the robotic system 100 can pick and transfer the recognized objects first, and then generate another set of image data from the sensors (e.g., the first imaging sensor 312 of FIG. 3). FIG. 5A is an illustration of sensor data 501 corresponding to a top surface following an initial set of operations (e.g., picking and transferring the recognized objects 412) in accordance with one or more embodiments of the present technology. The shaded areas in FIG. 5A correspond to changes in depth measurements following the removal of two of the recognized objects 412 shown in FIGS. 4B and 4C.

When the robotic system 100 does not detect any recognized objects 412 in the image data, the robotic system 100 can identify any exposed outer corners 426 and/or the exposed edges 422 for locating the unrecognized objects 414 of FIG. 4A. For example, the robotic system 100 can process the sensor data 501 similarly as described above to identify the exposed outer corners 426 and/or the exposed edges 422. Accordingly, the robotic system 100 can additionally identify and/or locate any corners/edges that are exposed after removing the recognized objects 412. In some embodiments, the robotic system 100 can further identify exposed inner corners 502 as intersections/junctions between two or more of the exposed edges 422 of FIG. 4B according to a corresponding threshold. For example, the robotic system 100 can identify the exposed inner corners 502 as junctions between two or more of the exposed edges 422 that exceed 180° relative to the corresponding continuous surfaces. In some embodiments, the robotic system 100 can identify the exposed inner corners 502 when the exposed edges 422 form an angle that is within a threshold range of about 270°.

In some embodiments, when none of the recognized objects 412 are remaining, the robotic system 100 can identify registration targets 506 in the target stack 310 (e.g., from amongst the unrecognized objects 414) based on the exposed corners and/or exposed edges. For example, the robotic system 100 can select the region of the sensor data 501 and the corresponding unrecognized object 414 associated with the exposed outer corners 426. In other words, after processing the recognized objects 412, the robotic system 100 can process the unrecognized objects 414 that form/constitute the exposed outer corners 426 of the target stack 310. Based on analyzing the corresponding portions of the sensor data 501, the robotic system 100 can grip the unrecognized objects 414, lift and/or horizontally transfer the gripped object, and/or image the gripped object for registration purposes. Additionally, after imaging the gripped object, the robotic system 100 can transfer the gripped object to a destination (e.g., the conveyor 306 of FIG. 3).

Figure 5B:
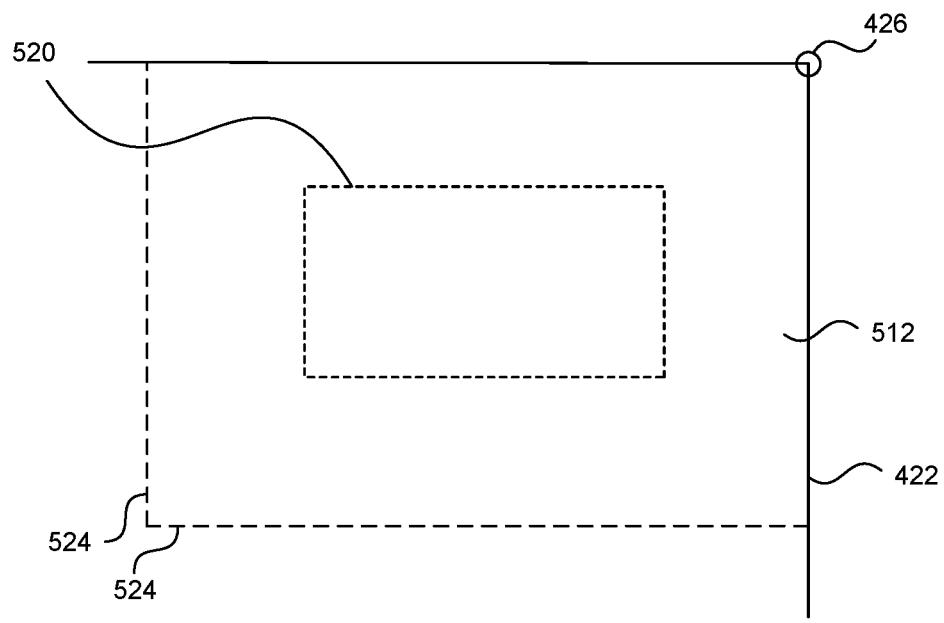
FIG. 5B is an illustration of a portion 5B of the sensor data illustrated in FIG. 5A in accordance with one or more embodiments of the present technology.

For further describing the sensor data analysis, FIG. 5B is a detailed illustration of a portion 5B of the sensor data 501 of FIG. 5A in accordance with one or more embodiments of the present technology. The robotic system 100 can analyze the sensor data 501 according to an MVR 512 to determine a grip location 520. The MVR 512 can represent a minimum-sized area required to contact, grip, and/or lift objects. In other words, the MVR 512 can represent an estimate of a surface (e.g., a top surface) of one object. For example, the MVR 512 can be associated with a footprint of the end-effector 304 of FIG. 3, such as an area occupied by the end-effector 304 (e.g., the suction cups of the gripper), or a larger area with additional/buffer regions surrounding the footprint. In some embodiments, the MVR 512 can correspond to a minimum and/or a maximum candidate size, which can correspond to physical dimensions (e.g., lengths, widths, heights, diameters, circumferences, etc.) for the smallest/largest possible instance of the objects in the target stack 310. In other words, none of the objects within the target stack 310 will have dimensions that are less than the minimum candidate size and greater than the maximum candidate size. The minimum/maximum candidate sizes can be predetermined values (i.e. values provided in advance of processing the target stack 310).

In some embodiments, the robotic system 100 can derive the MVR 512 based on extending two or more intersecting lines from the exposed edges 422 over the corresponding surface (e.g., an area with height/depth values that are within a threshold range from each other). For example, the robotic system 100 can derive the MVR 512 based on extending perpendicular lines from the exposed edges 422 about the exposed outer corner 426. The lines can be extended from a portion (e.g., a point) on the exposed edges 422 that corresponds to a separation distance from the exposed outer corner 426. The separation distance can be a predetermined value and/or a value that is calculated according to one or more processing results (e.g., estimated edges 524 or corresponding confidence values and/or estimated identity of the corresponding object or corresponding confidence values). Accordingly, the robotic system 100 can derive the MVR 512 as the area defined by the extended lines and the exposed edges 422.

In other embodiments, the robotic system 100 can move along the exposed edges 422 and analyze regions surrounding (e.g., within a predetermined distance of) the exposed edges. Based on the analysis, the robotic system 100 can identify other 2D/3D edges about the exposed edges 422. The robotic system 100 can determine the identified edges as the estimated edges 524 based on testing the identified edges. For example, the robotic system 100 can determine the estimated edges 524 when the identified edges intersect the analyzed exposed edge 422 and/or are parallel with the complementary exposed edge 422.

In some embodiments, the robotic system 100 can derive a grip location 520 using the MVR 512. The grip location 520 can correspond to an area on the object/stack that will be directly under and/or contact the end-effector 304 for the initial manipulation. In other words, the robotic system 100 can place the gripper over the grip location 520 to grip the corresponding object for subsequent manipulations (e.g., lift, horizontal transfer, and/or data collection processes for registration). The robotic system 100 may derive the grip location 520 covering a middle portion of the MVR 512. Also, the robotic system 100 may derive the grip location 520 (e.g., a footprint of the end-effector 304) aligned with and abutting one or more of the exposed edges 422 and/or aligned with one of the exposed outer corners 426. The robotic system 100 may derive the off-center grip location when confidence levels associated with the estimated edges 524 or other processing results fall below a predetermined threshold.

The robotic system 100 can use the derived grip location 520 to maneuver the robotic arm 302 of FIG. 3 and the end-effector 304. The robotic system 100 can grip the object (e.g., the registration target 506) located at the corner of the stack at the grip location 520. In some embodiments, the robotic system 100 can lift and/or horizontally transfer the gripped object for clearly distinguishing the previously non-exposed edges. For example, the robotic system 100 can lift and/or horizontally transfer the object by a predetermined distance for accurately distinguishing edges. Also, for example, the robotic system 100 can lift and/or horizontally transfer the object while monitoring and/or analyzing the height changes and/or a tilt in the end-effector, such that additional edges opposite to the exposed edges 422 become recognizable. The robotic system 100 can obtain and process data during and/or after the initial lift to further describe the unrecognized objects 414.

Gathering Registration Data for Unrecognized Objects

FIG. 6 is an illustration of an object after an initial-lift maneuver in accordance with one or more embodiments of the present technology. In some embodiments, the robotic system 100 can include one or more sensors configured to measure a force exerted on the robotic arm 302 of FIG. 3 due to an external object (e.g., the gripped object) and/or a movement thereof. For example, the robotic system 100 can include a force sensor, a torque sensor, or a combination thereof (e.g., a force-torque (FT) sensor 602) attached to and/or integral with the end-effector 304. Accordingly, the robotic system 100 can measure a downward force measurement 604 and/or a torque measurement 606 while lifting the gripped object (e.g., one of the unrecognized objects 414 of FIG. 4 that has been determined as the registration target 506) gripped at the grip location 520 of FIG. 5.

In some embodiments, the robotic system 100 can use the downward force measurement 604 to determine a weight of the registration target 506. In some embodiments, the robotic system 100 can use the downward force measurement 604 and/or the torque measurement 606 to calculate an estimated torque-arm vector 608 and/or an estimated center-of-mass (CoM) 610 for the registration target 506. The estimated torque-arm vector 608 can correspond to a sum of measurement vectors provided by the FT sensor 602. The robotic system 100 can calculate the estimated CoM 610 according to a predetermined process and/or equation that uses the estimated torque-arm vector 608, the torque measurement 606, and/or the downward force measurement 604 as inputs.

In some embodiments, the robotic system 100 can use the sensor measurements as feedback signal for performing the initial-lift maneuver. For example, the robotic system 100 can perform the initial-lift maneuver until the downward force measurement 604 and/or the torque measurement 606 stabilizes (e.g., measurements over a measurement period remain within a threshold range). Accordingly, the robotic system 100 can determine when the gripped object is lifted off (i.e., no longer supported by) an object or a structure underneath and becomes solely supported by the robotic arm 302. The robotic system 100 can use the determined stabilization as a trigger to stop the initial-lift maneuver and/or obtain additional data (e.g., dimensions, weight, CoM, and/or surface images) regarding the gripped object.

Figure 7A:
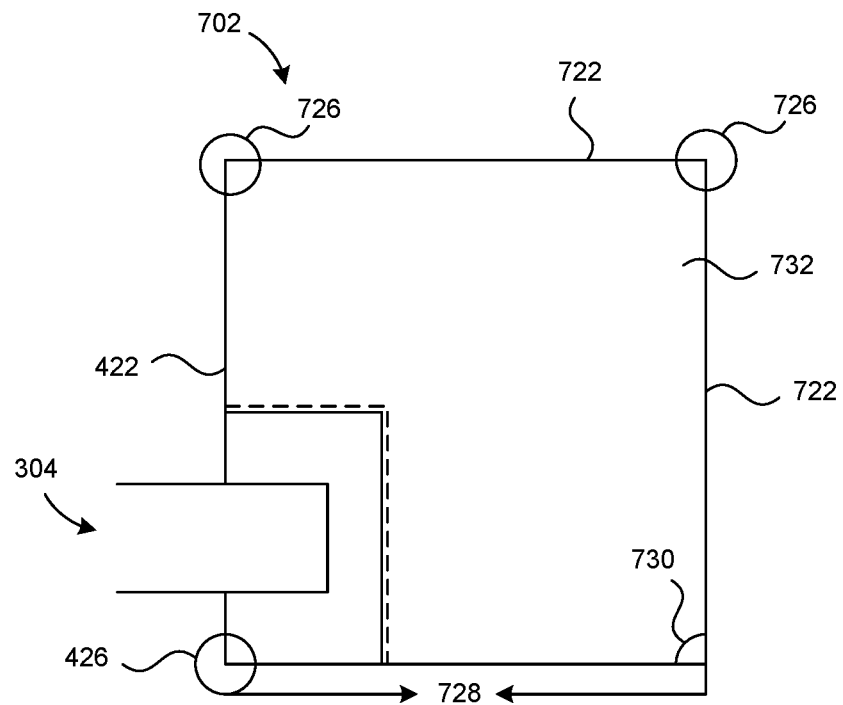
FIG. 7A is an illustration of comparison data in accordance with one or more embodiments of the present technology.
Figure 7B:
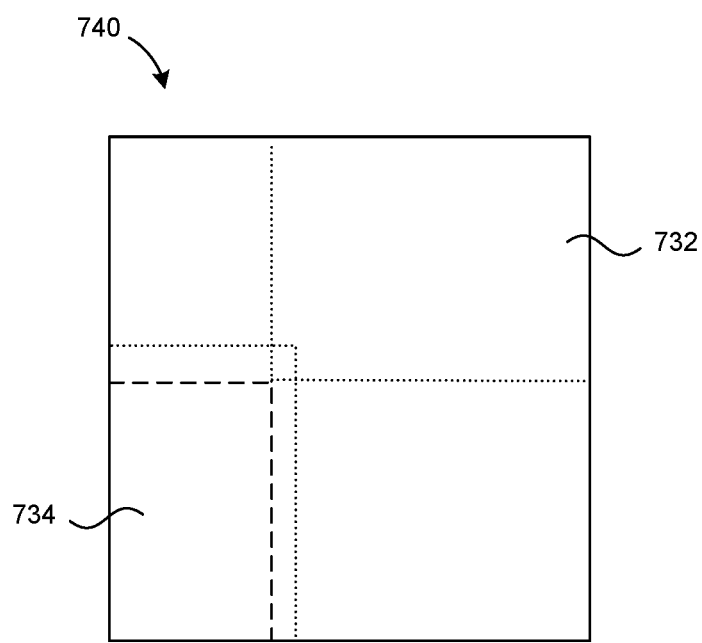
FIG. 7B is an illustration of updated data in accordance with one or more embodiments of the present technology.

To further describe the obtained data regarding the gripped object (e.g., the unrecognized object 414 of FIG. 4B), FIG. 7A is an illustration of comparison data 702, and FIG. 7B is an illustration of updated data 740, both in accordance with one or more embodiments of the present technology. As described above, the robotic system 100 can grip the unrecognized objects 414 based on the MVR 512 of FIG. 5B. Based on the grip, the robotic system 100 can lift (via, e.g., the initial-lift maneuver) and/or horizontally transfer the gripped object, thereby separating the gripped object from adjacent and abutting objects/surfaces. The robotic system 100 can obtain the comparison data 702 (e.g., 2D/3D measurement data, such as visual images, depth maps, point clouds, etc.) after lifting and/or horizontally transferring the gripped object. In some embodiments, the comparison data 702 can be obtained via one or more of the sensors 216 of FIG. 2, such as the first imaging sensor 312 of FIG. 3.

The robotic system 100 can further generate updated images (e.g., the updated data 740) of the unrecognized objects 414 based on the initial sensor data (e.g., the top view data 420 of FIG. 4C and/or the sensor data 501 of FIG. 5A obtained before lifting the object) and/or the comparison data 702. In some embodiments, the robotic system 100 can generate the updated data 740 based on combining image data before and after the initial-lift maneuver. For example, the robotic system 100 can derive a cropped portion 734 from the top view data 420 and/or the sensor data 501 that corresponds to the MVR 512 and/or the grip location 520. The robotic system 100 can derive the cropped portion 734 based on mapping the MVR 512 and/or the grip location 520 to the initial sensor data and copying the pixel information and/or the depth measure in the corresponding area. The robotic system 100 can generate the updated data 740 based on overlaying the cropped portion 734 over the comparison data 702. The position of the cropped portion 734 relative to the updated data 740 can be determined using the exposed outer corner 426 and the exposed edges 422 as references. Accordingly, the robotic system 100 can use the cropped portion 734 to cover areas within the comparison data 702 that depict the robotic arm 302 of FIG. 3 and/or the end-effector 304 of FIG. 3.

In some embodiments, the robotic system 100 can identify or derive dimensions of the lifted objects based on the comparison data 702. The robotic system 100 may use the resulting dimensions to crop a corresponding portion from the initial sensor data. The robotic system 100 can generate the updated data 740 as the cropped portion from the initial sensor data that corresponds to where the newly discovered boundaries were before the initial lift.

In some embodiments, the robotic system 100 can derive an uncovered portion 732 from the comparison data 702. The uncovered portion 732 can correspond to the top surface of the unrecognized object 414 not covered by the end-effector 304 and/or the robotic arm 302. The robotic system 100 can use one or more predetermined patterns of the end-effector 304 and/or the robotic arm 302 to derive the uncovered portion 732. For example, the robotic system 100 can derive the uncovered portion 732 based on recognizing and removing portions of the comparison data 702 that match the predetermined visual/pixel patterns. The robotic system 100 can combine the uncovered portion 732 with the cropped portion 734 to generate the updated data 740.

The robotic system 100 can process the comparison data 702 and/or the updated data 740 to obtain information regarding one or more physical characteristics of the gripped object. For example, the robotic system 100 can process the comparison data 702 for the outline/shape of the object, including discovered edges 722, discovered corners 726, edge length measurements 728, and/or corner angle measurements 730. The robotic system 100 can use one or more edge detection schemes described above to determine the discovered edges 722 opposite the corresponding exposed edges 422. Elevating the unrecognized objects 414 based on deriving and gripping according to the MVR 512 creates height differences between the top surface of the lifted object and the surrounding objects/surfaces. The height differences can be used to clearly determine the discovered edges 722. The robotic system 100 can determine the discovered edges 722 based on searching for edges that extend from the exposed edges 422. In some embodiments, the robotic system 100 can determine the discovered edges 722 based on determining edges that extend from the exposed edges 422 at about a right angle, such as for rectangular boxes/packages that have a rectangular top surface.

The robotic system 100 can determine the discovered corners 726 as junctions where two or more of the discovered edges 722 with different orientations intersect. In some embodiments, the robotic system 100 can determine angles of the discovered corners 726 (e.g., the corner angle measurements 730), such as according to predetermined functions or equations.

Based on determining the discovered edges 722, the robotic system 100 can calculate the edge length measurements 728 (e.g., the object dimensions) for the discovered edges 722 and/or the exposed edges 422. The robotic system 100 can calculate the edge length measurements 728 based on determining the lengths of edges in the captured image (e.g., the comparison data 702 and/or the sensor data 501) and translating the lengths in the image into real-world length, such as according to one or more predetermined mapping functions/equations.

In some embodiments, the robotic system 100 can determine the edge length measurements 728 based on the comparison data 702 and use the edge length measurements 728 to generate the updated data 740 as an image depicting a surface (e.g., a top surface) of the lifted unrecognized object. For example, when cropping a portion of the top view data 420 and/or the sensor data 501, the robotic system 100 can extend beyond one or more boundaries of the MVR 512 and up to the corresponding edge length measurements 728. In lifting some objects according to the exposed edges/corners, the robotic arm 302 may end up occluding portions of the lifted object in the comparison data 702, such as when the exposed corners are located opposite the robot base. Accordingly, the robotic system 100 can determine the occluded region relative to the exposed corner/edges and/or the edge length measurements 728 and crop the corresponding portions from the top view data 420 and/or the sensor data 501. As described above, the robotic system 100 can overlay the cropped portion to replace the occluded region using the exposed corner/edges and/or the edge length measurements 728 as reference. The robotic system 100 can generate the updated data 740 as the combined image with the cropped portion from the initial image (e.g., the first image obtained before lifting) overlaid on or replacing occluded portions in the comparison data 702.

Based on one or more of the processing results described above, the robotic system 100 can generate the registration data 254 for the corresponding object (e.g., the unrecognized objects 414). For example, when the robotic system 100 determines that the target stack 310 or a portion thereof (e.g., the top layer) includes one or more unrecognized objects 414, the robotic system 100 can select one of the unrecognized objects 414 as the registration target 506, manipulate the registration target 506, and/or obtain data regarding the registration target 506 as described above. Further, the robotic system 100 can follow a predetermined protocol/format to create a new instance of the registration data 254 (e.g., a new entry or record in the master data 252 of FIG. 2) for the registration target 506. Accordingly, the robotic system 100 can store the obtained data in the new instance of the registration data 254. For example, the robotic system 100 can store the edge length measurements 728 as horizontal dimensions, the corner angle measurements 730 or a derivative thereof as a horizontal shape, the updated data 740 as a surface image, or a combination thereof regarding the registration target 506.

The updated data 740 based on the comparison data 702 and the initial data provides improved object recognition. Using the comparison data 702, which is obtained after lifting the registration target 506, as a basis to generate the updated data 740 leads to accurate determination of object edges. The increased accuracy in determining the object edges further provides increased accuracy in determining the surface image and the various measurements described above. The improved accuracy in the obtained data and the surface image further increases the likelihood of subsequently recognizing the same type of objects based on the corresponding registration data 254. In some embodiments, obtaining and processing the comparison data 702 provides improved accuracy in measurements and surface image over processing the initial data alone or processing the state of the stack. Since the initial lift and/or horizontally transfer may disturb or move the objects surrounding the registration target 506, directly analyzing the registration target 506 instead of the remaining stack after the initial lift and/or horizontal transfer provides the improved accuracy.

Example Object Detection and Registration Scenarios

Figure 8B:
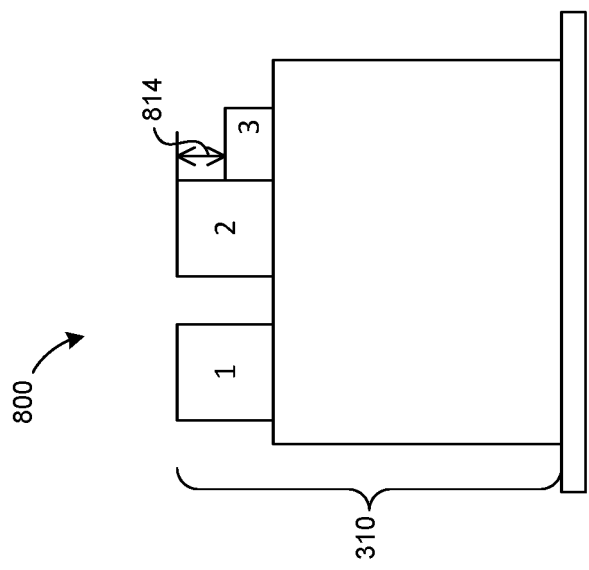
FIG. 8B is an illustration of side-view for the direct registration conditions in accordance with one or more embodiments of the present technology.
Figure 8A:
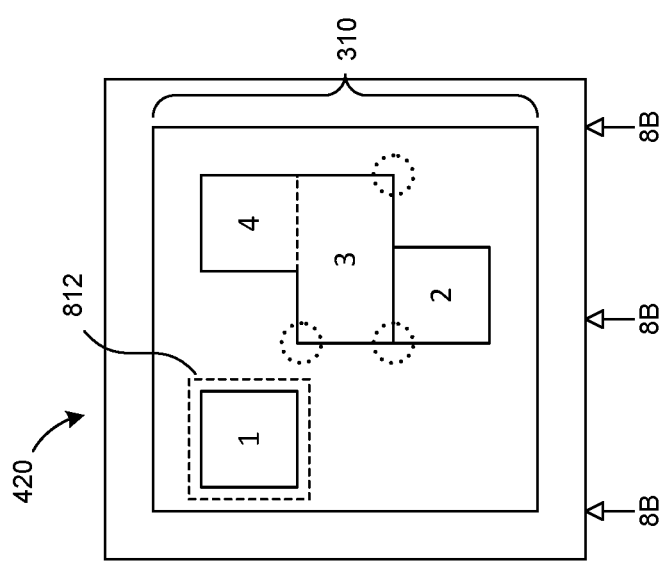
FIG. 8A is an illustration of top-view data for direct registration conditions in accordance with one or more embodiments of the present technology.

FIG. 8A is an illustration of top-view data (e.g., the top view data 420 from the first imaging sensor 312 of FIG. 3, such as the top-view sensor 312a of FIG. 3), and FIG. 8B is an illustration of side-view 800 (which can optionally be represented as side-view data, such as such as the side-view sensor 312b of FIG. 3), both of which can be the direct registration conditions in accordance with one or more embodiments of the present technology. The side-view data can be option and is not essential for the implementation of the present invention. The side-view data 800 can represent the target stack 310 according to direction 8B of FIG. 8A. Referring to FIGS. 8A and 8B together, the robotic system 100 can analyze the top view data 420 and optionally the side-view data 800 to identify and process the direct registration conditions associated with the target stack 310.

The direct registration conditions can be associated with recognition of objects having sufficient separation with other surrounding objects/surfaces. In some embodiments, the direct registration conditions can be based on a separation threshold 812. The separation threshold 812 can correspond to a threshold distance between adjacent edges. In other words, the separation threshold 812 can correspond to a requirement for identifying a region surrounding an object or an estimate thereof (e.g., the MVR 512 of FIG. 5B) that is different (e.g., different visual characteristics and/or different depth measures) from the object. As an illustrative example, the robotic system 100 can detect object labeled '1' based on analyzing regions surrounding the corresponding MVR. Since the object is horizontally separated from objects '3' and '4' by distances exceeding the separation threshold 812.

Also, as an illustrative example, the robotic system 100 can similarly detect object labeled '2' based on the separation threshold 812. When adjacent objects (e.g., objects 2 and 3) have a height difference 814 between top surfaces thereof that exceed a threshold, the robotic system 100 can determine that the surfaces of the objects are not at the same height. Accordingly, the portions surrounding object 2 may be considered open. Thus, the surrounding portions may satisfy the separation threshold 812, and the robotic system 100 can detect object 2 similarly as described above.

In some embodiments, the robotic system 100 can further analyze and classify MVRs according to other processing results. For example, the robotic system 100 can classify MVRs as certain or uncertain based on a number of open/3D corners included in or associated with the MVRs. As an illustrative example, the robotic system 100 can determine certain MVRs as MVRs that include or are associated with three or more open corners. The robotic system 100 can determine uncertain MVRs as MVRs that include or are associated with one or two open corners. Thus, the robotic system 100 can classify the MVR associated with object 3 as a certain MVR according to the three exposed/3D corners included therein.

The robotic system 100 can verify the MVRs, such as by comparing the MVR dimensions/size against predetermined thresholds (e.g., minimum and/or maximum thresholds). The robotic system 100 can verify the MVRs that satisfy the predetermined thresholds. For the verified MVRs that satisfy one or more of the direct registration conditions, the robotic system 100 can detect an object (by, e.g., determining/concluding that an object exists at a location corresponding to the qualifying MVRs). Further the robotic system 100 can directly register the detected object. For example, the robotic system 100 can create an instance of the registration data 254 of FIG. 2 for the detected unrecognized object and store the corresponding qualified MVR therein. The robotic system 100 can directly register the object based on storing the MVR without further adjustments/verifications/tests for the MVR.

Figure 9A:
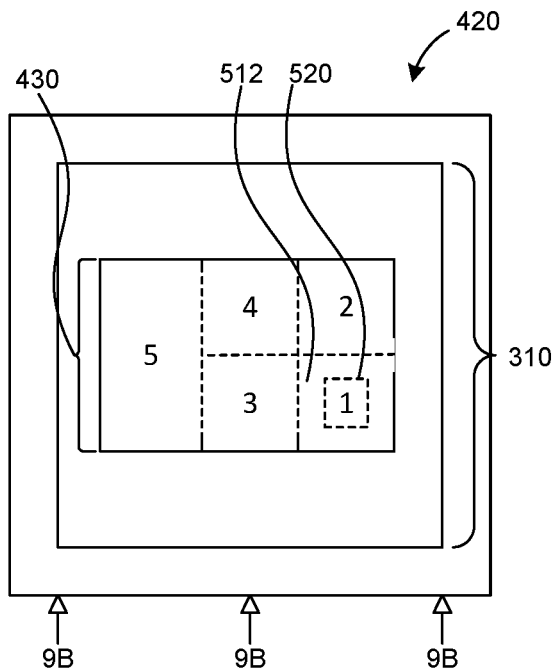
FIG. 9A is an illustration of top-view data for an expected condition in accordance with one or more embodiments of the present technology.
Figure 9B:
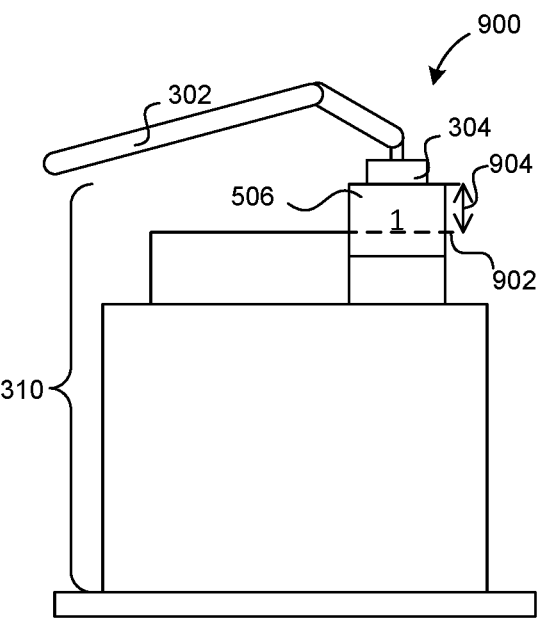
FIG. 9B is an illustration of side-view for the expected condition in accordance with one or more embodiments of the present technology.
Figure 9C:
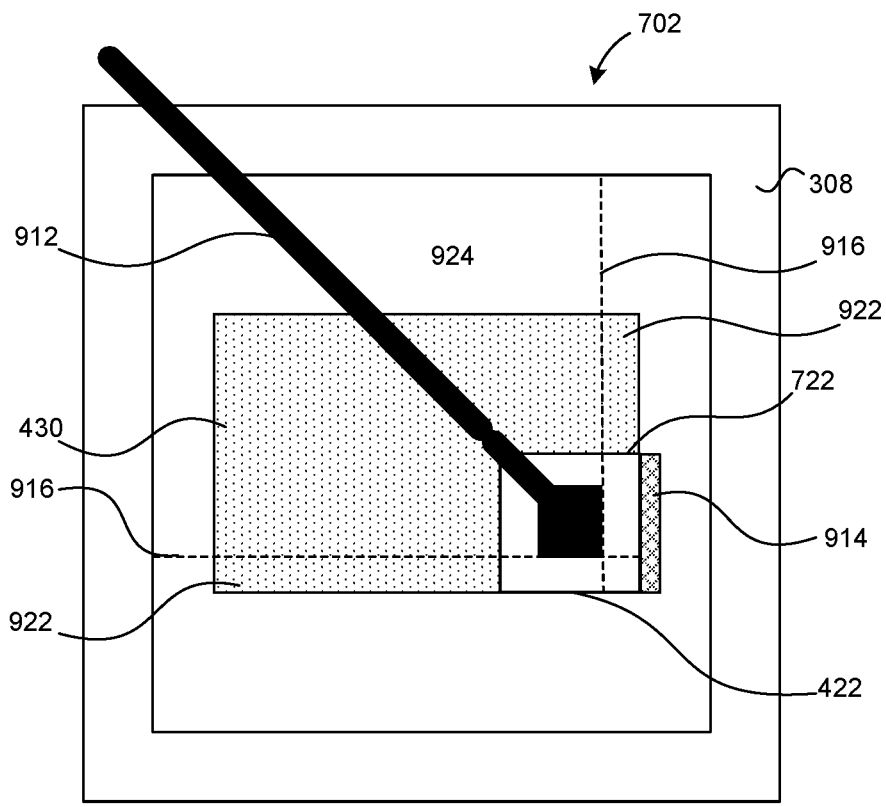
FIG. 9C is an illustration of the comparison data for the expected condition in accordance with one or more embodiments of the present technology.

FIGS. 9A-9C illustrate various aspects of an expected condition following an initial movement (e.g., the initial lift) of the registration target 506. FIG. 9A is an illustration of top-view data (e.g., the top view data 420), FIG. 9B is an example illustration of side-view of the target stack (optionally represented as the side-view data 900), and FIG. 9C is an illustration of the comparison data 702, all for an expected condition in accordance with one or more embodiments of the present technology.

Referring now to FIGS. 9A-9C together, the expected condition can correspond to when the derived MVR for the registration target 506 accurately matches a surface of the registration target 506 and its boundaries. For the initial movement, the robotic system 100 may operate the robotic arm 302 and/or the end-effector 304 to grip the registration target 506 according to the grip location 520 that is in a middle portion of the MVR 512 for the registration target 506 (e.g., object '1'). The robotic system 100 may lift the registration target 506 by an initial lift height 904, thereby displacing a top surface of the registration target 506 from an initial depth measurement/height thereof by the same amount. Thus, the robotic system 100 can cause a vertical separation between the top surface of the registration target 506 and the surrounding and previously abutting surfaces.

The robotic system 100 can obtain the comparison data 702 after the initial movement. The comparison data 702 can include a representation of the top surface surrounded by the unmatched portion 430. The comparison data 702 can further include occluded regions 912 that depict the robotic arm 302 and/or the end-effector 304 between the sensor and the object(s). The initial lift may also create lift-based occlusions caused by the registration target 506 being moved/lifted between the sensor and portions of objects that were previously visible. As such, the comparison data 702 may not depict lift-based occlusions 914 (e.g., portions that were previously adjacent to/abutting the registration target 506) that were depicted in the initial image data (e.g., the top view data 420). For the example illustrated in FIG. 9C, the lift-based occlusions 914 can be to the right of the registration target 506 when the first imaging sensor 312 is located over a center portion of the target stack 310.

The robotic system 100 can analyze the comparison data 702 to identify layers, edges, and/or corners as described above. In analyzing the comparison data 702, the robotic system 100 can account for the various occlusions, such as by removing or not considering the occluded regions 912 and/or the lift-based occlusions 914 for the layer/edge identification. Since the robotic system 100 can track or derive the real-world locations/poses of the robotic arm 302 and/or the end-effector 304, the robotic system 100 can determine the such locations/poses at the time of the comparison data 702. The robotic system 100 can use the real-world poses to map and determine corresponding portions in the comparison data 702. The resulting portions can be the occluded regions 912, which can be masked or flagged as being removed from analysis (e.g., edge detection).

In some embodiments, the robotic system 100 may derive analysis boundaries 916 used to define/designate portions of the comparison data 702 as analysis regions 922 (e.g., the uncovered portion 732 of FIG. 7B or a portion thereof). For example, the robotic system 100 can derive each of the analysis boundaries 916 relative to the exposed edges 422 and/or the discovered edges 722 of FIG. 7A. Each of the analysis boundaries 916 can be oriented parallel to one of the exposed edges 422 and/or the discovered edges 722 and coincide with or intersect a laterally peripheral location of the end-effector 304 (e.g., a portion/point closes to the nearest complemented edge 422 or 722). The robotic system 100 can derive the portions of the image between the analysis boundaries 916 and the corresponding edges 422/722 as the analysis regions 922. The analysis regions 922 can extend out to one or more known or derived locations, such as up to peripheral ends of the platform (e.g., the pallet 308) and/or peripheral ends of the target stack 310 (e.g., the corresponding exposed edges 422 that define the unmatched portion 430). The resulting analysis regions 922 can each represent a portion of the second image data that is separate from (e.g., excludes) occluded regions. As such, the robotic system 100 can process the analysis regions 922, such as for identifying edges, dimensions, etc., and mask/ignore the occluded regions.

The robotic system 100 can further derive the analysis boundaries 916 according to the known locations/poses of the robotic arm 302 such that the analysis boundaries 916 define a masked region 924 that includes known locations/poses of the robotic arm 302. For example, the robotic system 100 can determine that the robotic arm 302 extends across a particular corner of the MVR to access the registration target 506 based on the motion planning and/or relative locations of the robotic unit (e.g., a base) and the registration target 506. The robotic system 100 can determine the masked region 924 as the region bounded by the analysis boundaries 916 and includes the particular corner. The masked region 924 can correspond to the occluded regions. As such, the robotic system 100 can ignore or not process the masked region 924 for certain processes, such as for identifying edges and/or measuring lengths.

The robotic system 100 can process the analysis regions 922 and ignore the masked region 924 to identify the discovered edges 722. In other words, according to the known locations/poses of the robotic arm 302 and/or the end-effector 304, the robotic system 100 can identify and process relatively small strips coincident with the exposed edges 422 in the comparison data 702 as the analysis regions 922. Since the resulting analysis regions 922 are likely not occluded, the robotic system 100 can process the analysis regions 922 to identify the discovered edges 722 as described above (via, e.g., layer detection, the Sobel filter, etc.). After identifying the discovered edges 722 in the analyzed regions, the robotic system 100 may trace and/or extrapolate the discovered edges 722 beyond the analysis regions 922 according to a template shape (e.g., a rectangle). The robotic system 100 can determine the expected condition when the discovered edges 722 coincide with the estimated edges 524 of FIG. 5 of the MVR 512. In other words, the robotic system 100 can determine the expected condition when the discovered edges 722 are at the same locations (e.g., separation distances and/or orientations) as the estimated edges 524 relative to the exposed edges 422 of FIG. 4B.

The robotic system 100 can adjust for changes in locations/dimensions that may be caused by the initial lift. After adjusting, the robotic system 100 can generate the updated data 740 based on the discovered edges 722 as described above. For the expected condition, the robotic system 100 can use the MVR 512 or the portions of the image data within the MVR 512 as the updated data 740 (e.g., a representation of a surface of the registration target 506). Accordingly, the robotic system 100 can detect and register the registration target 506 as described above. In some embodiments, the robotic system 100 can identify the lift-based occlusions 914 (based on, e.g., the known lift height, edge locations relative to a sensor location, corresponding angles, etc.) and adjust the updated data 740 accordingly.

Figure 10A:
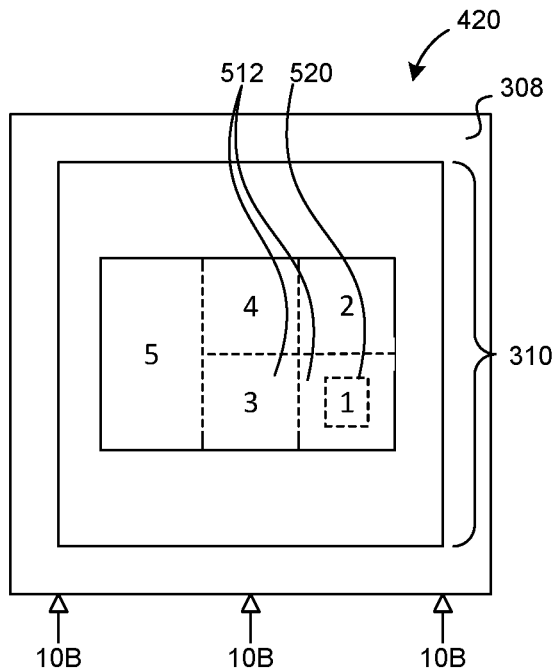
FIG. 10A is an illustration of top-view data for an unexpected condition in accordance with one or more embodiments of the present technology.
Figure 10B:
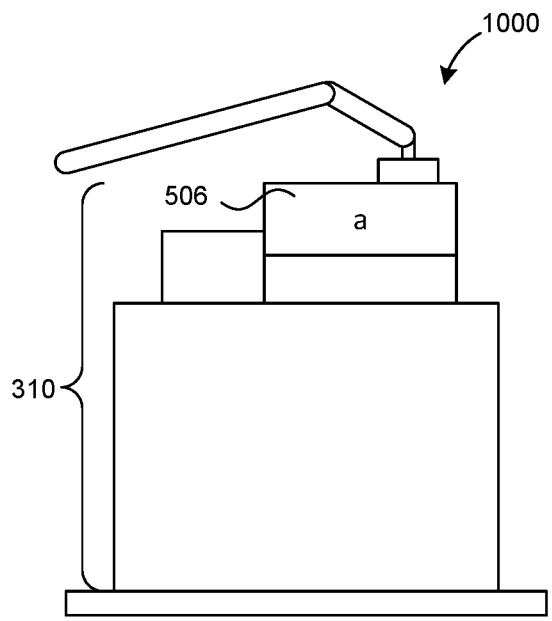
FIG. 10B is an illustration of side-view for the unexpected condition in accordance with one or more embodiments of the present technology.
Figure 10C:
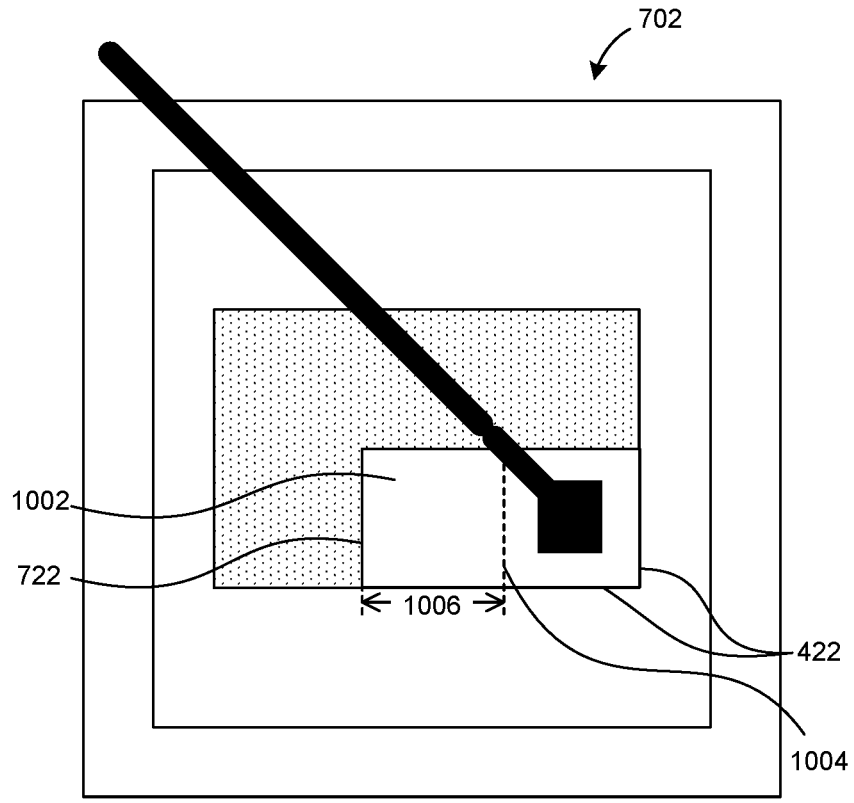
FIG. 10C is an illustration of the comparison data for the unexpected condition in accordance with one or more embodiments of the present technology.

FIGS. 10A-10C illustrate various aspects of an unexpected condition following an initial movement (e.g., the initial lift) of the registration target 506. FIG. 10A is an illustration of top-view data (e.g., the top view data 420), FIG. 10B is an illustration of side-view of the object stack 310 (optionally represented as the side-view data 1000), and FIG. 10C is an illustration of the comparison data 702, all for an expected condition in accordance with one or more embodiments of the present technology.

Referring now to FIGS. 10A-10C together, the robotic system 100 can cause a vertical separation as described above between the top surface of the registration target 506 and the surrounding and previously abutting surfaces. The unexpected condition can correspond to when the derived MVR for the registration target 506 does not match a surface of the registration target 506 and its boundaries after the initial movement.

As an illustrated example, the robotic system 100 may derive five MVRs that correspond to five estimated objects forming a top layer of the target stack 310. The robotic system 100 can select and manipulate (e.g., grip and initially lift) the registration target 506 corresponding to the estimated object labeled '1'. However, when the object estimation is erroneous, the derived MVR may correspond to only a portion of a surface or correspond to surfaces of more than one objects for other object estimation errors.

When the derived MVR 512 fails to cover an entirety of the actual object as shown in FIG. 10B, the initial lift may cause displacement (e.g., change in depth measures) for an unexpected portion 1002 in the comparison data 702. The unexpected portion 1002 can correspond to portions outside of the MVR 512, such as for portions in the comparison data 702 including and/or past one or more expected edge locations 1004 (e.g., locations corresponding to the estimated edges 524 of FIG. 5B). Thus, when the robotic system 100 analyzes the comparison data 702 as described above (e.g., layer separation, edge/corner identification, etc.), the identified surface may correspond to an area greater than the MVR 512 and cover the unexpected portion 1002.

The robotic system 100 may generate the edge length measurements 728 of FIG. 7A by measuring lengths of the discovered edges 722 and/or the newly exposed edges 422 in the comparison data 702. The robotic system 100 may detect the unexpected conditions when the measured lengths do not match the dimensions of the MVR 512. For example, evaluating the initial MVR can include detecting the unexpected condition when one or more portions and/or the exposed edges of a second image data (e.g., the comparison data 702 of FIG. 7A) fail to match corresponding portions of the initial MVR.

In some embodiments, the robotic system 100 can further calculate a compensation length 1006 for portions of edges extending beyond the expected edge location 1004. The robotic system 100 can adjust the measured lengths to account for changes in sizes/lengths of depicted objects caused by the displacement/lift of the object as described above. Based on the adjusted lengths (e.g., real-world lengths), the robotic system 100 can adjust the MVR 512 and generate the updated data 740 of FIG. 7B. For the example illustrated in FIG. 10C, the robotic system 100 can generate the updated data 740 by extending the MVR 512 by the adjusted compensation length 1006 along a horizontal direction (e.g., to the left) away from the parallel exposed edge.

Based on detecting the unexpected conditions, the robotic system 100 may lower and release/drop the registration target 506 and regrip the object according to the updated MVR 512. The robotic system 100 may obtain an updated image (e.g., a new instance of the top view data) after the release/drop to account for any shifts in the objects. Based on the updated image, the robotic system 100 can re-derive the MVR 512 according to the edge length measurements 728. Using the re-derived MVR 512, the robotic system 100 can re-determine the grip location, such as over a center portion of the updated MVR. In some embodiments, the regripping process may be triggered when the compensation length 1006 exceeds a threshold length, when the downward force measurement 604 of FIG. 6 exceeds a threshold weight, and/or when the estimated torque-arm vector 608 of FIG. 6 exceeds a predetermined limit.

Figure 11A:
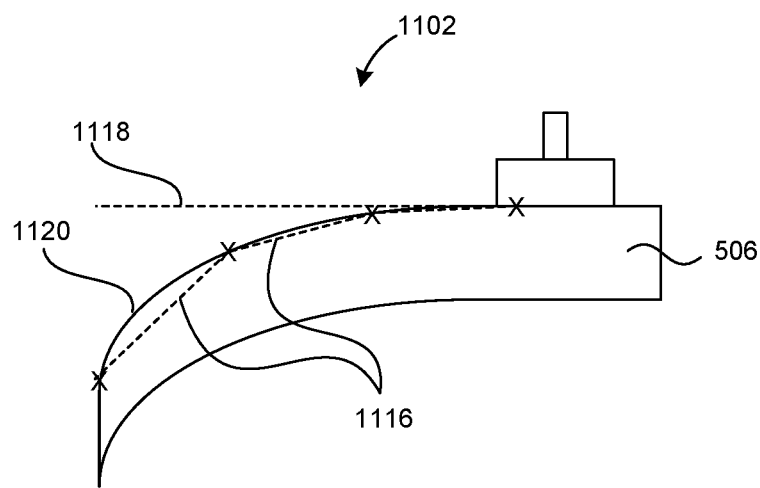
FIG. 11A is an illustration of a portion of side-view for a deformed-object condition in accordance with one or more embodiments of the present technology.
Figure 11B:
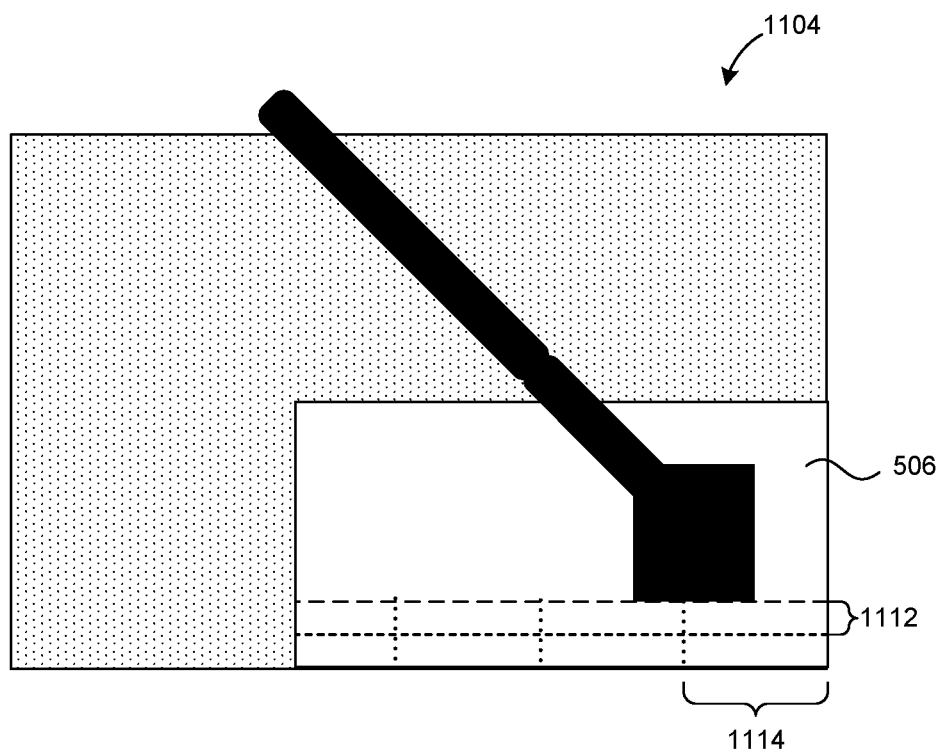
FIG. 11B is an illustration of a portion of the comparison data in accordance with one or more embodiments of the present technology.

FIGS. 11A-11B illustrate various aspects of another unexpected condition following an initial movement (e.g., the initial lift) of the registration target 506. FIG. 11A is an illustration of a portion of side-view of the registration target 506 (which can optionally be represented as side-view data 1102, such as an instance of the comparison data 702 of FIG. 7A from the side-view sensors 312b of FIG. 3), and FIG. 11B is an illustration of a portion of top-view data 1104 (e.g., an instance of the comparison data 702 from the top view sensors 312a of FIG. 3), both for a deformed-object condition in accordance with one or more embodiments of the present technology.

Referring now to FIGS. 11A-11B together, the robotic system 100 can cause a vertical separation as described above between the top surface of the registration target 506 and the surrounding and previously abutting surfaces. The object estimation may be erroneous, such as described above with respect to FIGS. 10A-10C, and the grip location 520 of FIG. 5 may not be optimal for the registration target 506 of FIG. 5A. In some instances, the object may deform due to its weight, flexibility or a lack of structural rigidity, or a combination thereof in light of the suboptimal grip location. For the example illustrated in FIG. 11A, the registration target 506 may bend downward.

The robotic system 100 can detect the deformed-object condition based on analyzing the comparison data 702 (e.g., as the optional side-view data 1102). For example, detecting the unexpected condition can include detecting the deformed-object condition based on comparing the exposed edges to a predetermined shape pattern. As a specific example, the robotic system 100 can detect the deformed-object condition based on identifying a shape of the exposed edges and/or patterns of changes/deviations in the edge slopes.

Based on detecting the deformed-object condition, the robotic system 100 may implement a different process to generate the edge length measurements 728 of FIG. 7A. In some embodiments, the robotic system 100 can estimate a length associated with a distorted surface/edge by segmenting the analysis regions 922 of FIG. 9C that result from one or more example processes described above. For example, the robotic system 100 can segment the analysis regions 922 to form analysis strips 1112 that run parallel/coincident with the exposed edge 422 associated with the corresponding analysis regions 922. The robotic system 100 can determine the analysis strips 1112 according to predetermined widths, and the analysis strips 1112 can extend out to the ends of the analysis regions 922. The robotic system 100 can further divide each of the analysis strips 1112 to form analysis sections 1114. Boundaries of the analysis sections 1114 can be perpendicular to the exposed edge 422 associated with the corresponding analysis regions 922 and be spaced apart by a predetermined horizontal distance.

The robotic system 100 can calculate a section length 1116 (e.g., a straight-line distance between adjacent boundaries) for each of the analysis sections 1114. The robotic system 100 may add the section lengths 1116 for each of the analysis strips 1112 and/or average the summed lengths of the analysis strips 1112 to derive a calculated object dimension 1118. Accordingly, the robotic system 100 can derive the calculated object dimension 1118 as an estimate of a length of a distorted edge/surface (e.g., an arc length 1120).

Figure 12:
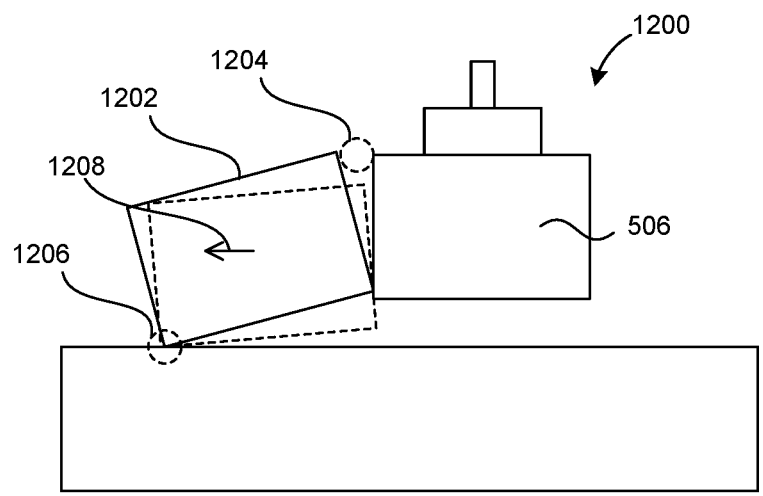
FIG. 12 is an illustration of a portion of side-view for a bitten condition in accordance with one or more embodiments of the present technology.

FIG. 12 is an illustration of a portion of side-view of the registration target 506 (which can optionally be represented as side-view data 1200, such as an instance of the comparison data 702 of FIG. 7A from the side-view sensors 312b of FIG. 3) for a bitten condition in accordance with one or more embodiments of the present technology. The bitten condition may correspond to a further unexpected condition where an object 1202 adjacent to the registration target 506 or a portion thereof is also displaced by the initial movement (e.g., the initial lift) of the registration target 506. For example, a peripheral portion or a protrusion of the adjacent object 1202 can contact and be supported by a portion of the registration target 506. As such, the supported portion of the adjacent object 1202 can elevate as the registration target 506 is raised during the initial lift.

For the bitten condition, the robotic system 100 may detect the unexpected condition as described above as the comparison data 702 (e.g., the top view and/or the side view) will include changes (e.g., changed depth measures) outside of the MVR 512 of FIG. 5B. The robotic system 100 may further investigate the comparison data 702 after detecting the unexpected condition. For example, the robotic system 100 can search for an object separation portion 1204 and/or a contact point 1206. The object separation portion 1204 can correspond to changes between continuous/patterned portions (e.g., surfaces) in the image data, such as differences in color, brightness, depth measure, etc. across horizontally adjacent locations. The robotic system 100 can detect the bitten condition when the comparison data 702 includes a surface (e.g., a laterally-oriented or gripped surface) around/under the end-effector 304 of FIG. 3 and laterally abutting the object separation portion 1204, which further laterally abuts another surface (e.g., an angled or a concave surface). The robotic system 100 may identify the angled surface or the concave surface based on identifying edges and/or horizontal locations having image values (e.g., depth measures) that change across laterally-adjacent locations according to corresponding linear or concave patterns.

Alternatively or additionally, the robotic system 100 can detect the bitten condition by identifying one or more contact points 1206. The contact points 1206 can represent where the adjacent object 1202 contacts one or more object underneath. For example, when the registration target 506 is located on a peripheral portion of the top layer of the target stack 310, the side-view illustrates/represents a sloped peripheral edge of the adjacent object 1202 that is furthest away from the registration target 506. Also, the side-view can depict a sloped bottom edge above one or more laterally-oriented surfaces. The robotic system 100 can identify the contact points 1206 as a portion/location in the image data where the sloped peripheral edge and/or the sloped bottom edge contact one or the laterally-oriented surfaces underneath.

Based on detecting the bitten condition, the robotic system 100 can process the edges/surface directly under and/or surrounding the end-effector 304 and ignore/mask the other portions. In other words, the robotic system 100 can analyze the surface gripped by the end-effector 304 and classify the object separation portion 1204 and/or the top/angled surface of the adjacent object 1202 as part of the unmatched portion 430 not corresponding to the MVR 512. The unexpected condition may not directly indicate an error in the MVR 512. Accordingly, the robotic system 100 can obtain the edge length measurements 728 of FIG. 7A for the registration target 506, evaluate the MVR 512, obtain the surface image (e.g., the updated data 740 of FIG. 7B), detect the object, and/or register the object as described above.

For the bitten condition, transferring the registration target 506 may cause a pose change 1208 for the adjacent object 1202. In other words, moving the registration target 506, such as for the task implementation, may cause the adjacent object 1202 to come to rest at a different location/orientation than in the initial image (e.g., the first top view data 420 of FIG. 4C). As such, the robotic system 100 may obtain a new image data to capture and account for the pose change 1208.

In some embodiments, the robotic system 100 can implement a horizontal shift and/or a rotational movement for the registration target 506 as part of the initial lift. The horizontal shift and/or the rotational movement can be executed by the robotic arm 302 and/or the end-effector 304 while or after the registration target 506 is lifted to the initial lift height 904 according to predetermined commands/settings. The initial lift including the horizontal shift and/or the rotational movement can provide reduced occurrences of the bitten condition, thereby further improving the overall system efficiency and resource consumption (e.g., computing resource, such as processing time, memory, etc.).

Figure 13:
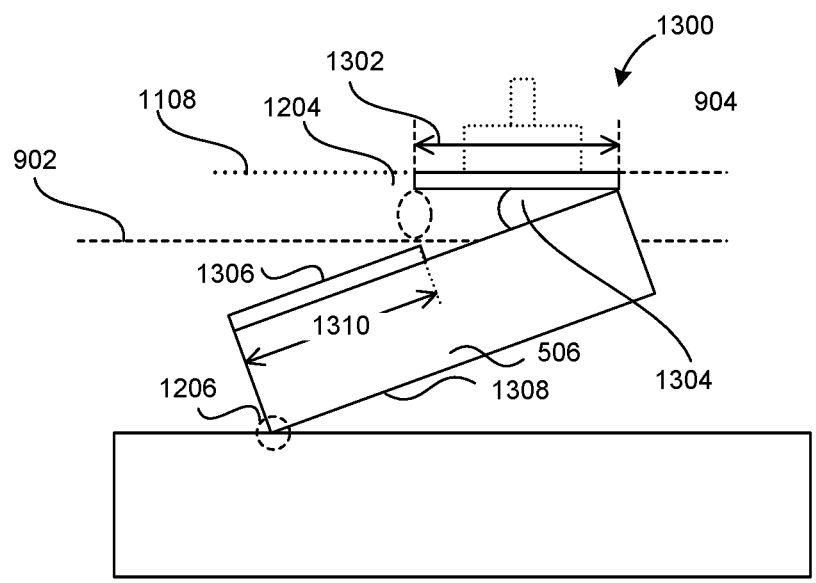
FIG. 13 is an illustration of a portion of side-view for an open-flap condition in accordance with one or more embodiments of the present technology.

FIG. 13 is an illustration of a side-view of the registration target (which can optionally be represented as side-view data 1300, such as an instance of the comparison data 702 of FIG. 7A from the side-view sensors 312b of FIG. 3) for an open-flap condition in accordance with one or more embodiments of the present technology. The open flap condition may correspond to a different unexpected condition generally caused by an erroneous estimation of the object surface and a structural failure/change in the registration target 506. For example, the robotic system 100 can initially derive the MVR 512 of FIG. 5B to cover one of the top flaps on an object (e.g., a box). The open-flap condition may occur when the robotic system 100 grips and lifts the object according to the initially derived MVR 512 and an adhesive mechanism (e.g., tape or glue) for the gripped flap fails. As a result, the gripped flap may remain fixed relative to the end-effector 304 while other portions of the object are lower and/or rotated away/downward from the end-effector 304.

For the open-flap condition, the robotic system 100 may detect the unexpected condition as described above as the comparison data 702 (e.g., the top view and/or the side view) will include changes (e.g., changed depth measures) outside of the MVR 512 of FIG. 5B. The robotic system 100 may further investigate the comparison data 702 after detecting the unexpected condition. For example, the robotic system 100 can search for the object separation portion 1204 and/or the contact point 1206 as described above. The robotic system 100 can differentiate the open-flap condition from the bitten condition described above by based on a horizontal component of the object separation portion 1204. The robotic system 100 can compare the horizontal component (e.g., lengths along x and/or y axis) of the object separation portion 1204 to one or more thresholds to detect the open-flap condition.

The robotic system 100 can further detect the open-flap condition based on identifying and testing one or more angled portions (e.g., a first angled portion 1306 and/or a second angled portion 1308) of the registration target 506. The first angled portion 1306 can correspond to a top surface or a corresponding edge of the registration target 506. The second angled portion 1308 can correspond to a bottom surface or a corresponding edge of the registration target 506. The robotic system 100 can detect the open-flap condition when the angled portions are continuous according to one or more predetermined patterns, such as for straight lines and/or concave lines or surfaces. Also, the robotic system 100 may detect the open-flap condition when the top surface or an associated edge has one portion above the initial depth 902 of the registration target 506 and another/opposite portion below the initial depth 902. In some embodiments, the robotic system 100 can detect the open-flap condition based on identifying one of the periphery edges/surfaces that is angled, connected to, and extending away from the gripped flap.

Based on detecting the open-flap condition, the robotic system 100 can calculate an actual length of the object according to the unexpected condition. For example, the robotic system 100 can measure a gripped length 1302 (e.g., a dimension) for the gripped surface. The robotic system 100 can further measure lengths (e.g., the edge length measurements 728 of FIG. 7) corresponding to the angled portions (e.g., the first and second angled portions/edges 1306 and/or 1308). The robotic system 100 can also use the angled portions to measure an open angle 1304 between the dropped portion of the object (e.g., the first angled portion 1306) and the gripped flap and/or the end-effector 304. The robotic system 100 can map the gripped length 1302 to one or more of the angled portions according to the open angle 1304 and calculate a remaining length 1310 for a remaining section of the mapped angled portion. Unlike the bitten condition, the open-flap condition may directly indicate an error in the MVR 512. As such, the robotic system 100 can use the gripped length 1302, the remaining length 1310, the open angle 1304, and/or the edge length measurements 728 of the angled portions to adjust the MVR 512 and/or generate the updated data 740. The robotic system 100 can lower, release/drop, and/or regrip the registration target 506 based on the adjusted MVR. For example, the robotic system 100 can update the grip location 520 of FIG. 5 to cover or extend over the two flaps.

Figure 14:
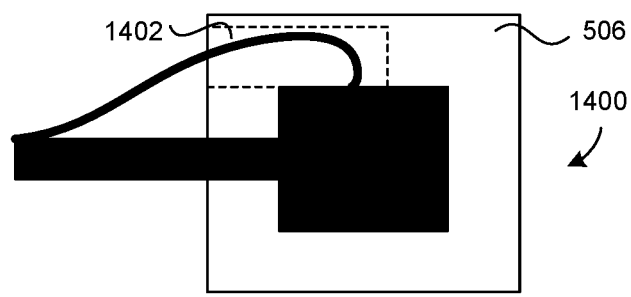
FIG. 14 is an illustration of a portion of an intermediate image data in accordance with one or more embodiments of the present technology.

FIG. 14 is an illustration of a portion of an intermediate image data 1400 (e.g., output from the top-view sensors 312a of FIG. 3) in accordance with one or more embodiments of the present technology. The robotic system 100 can obtain the intermediate image data 1400 from the top-view sensors 312a after implementing operations (by, generating/sending commands, such as the position commands, and/or settings) to place the end-effector 304 of FIG. 3 over the grip location 520 of 5B.

The robotic system 100 can analyze the intermediate image data 1400 to detect/identify accessory occlusion portions 1402 therein. The accessory occlusion portions 1402 can represent portions in the intermediate image data 1400 where accessory components (e.g., cables, wires, conduits, and/or other attachments) of the end-effector 304 and/or the robotic arm 302 of FIG. 3 are between the sensor and the registration target 506. In other words, the accessory occlusion portion 1402 can represent a portion/location of the intermediate image data 1400 that depicts a predetermined pattern corresponding to untracked accessories associated with the end-effector 304 and/or a robotic arm 302 attached to the end-effector 304. For example, while the robotic system 100 can track the locations of the structural components of the end-effector 304 and/or the robotic arm 302, the robotic system 100 may be unable to track the accessory components with similar accuracy. Accordingly, the robotic system 100 can analyze the intermediate image data 1400 to identify any edges or surfaces that match the predetermined patterns representative of the accessory components. For example, the robotic system 100 can identify continuous surfaces that have a predetermined width/shape and are attached to (e.g., at the same height as and/or laterally overlap with) tracked locations of the end-effector 304 and/or the robotic arm 302. The robotic system 100 can detect the accessory occlusion portions 1402 based on identifying the continuous surfaces.

In some embodiments, the robotic system 100 can implement operations to reposition (by, e.g., moving to a predetermined location and then re-placing) the end-effector 304 over the grip location 520 based on detecting the accessory occlusion portions 1402. The robotic system 100 can iteratively (re)position the end-effector 304 and obtain the intermediate image data 1400 until the intermediate image data 1400 is clear of (i.e., does not include) the accessory occlusion portions 1402. In some embodiments, the robotic system 100 can implement the repositioning when determined location of the accessory occlusion portions 1402 laterally overlap predicted locations of the analysis section 1114 of FIG. 11 (e.g., within a threshold distance from the exposed edges 422 of FIG. 4C and/or the estimated edges 524 of FIG. 5B). Thus, the robotic system 100 can increase the likelihood of preventing the accessory occlusion portions 1402 from occurring in the comparison data 702 of FIG. 7A (e.g., image obtained after the initial displacement).

Figure 15:
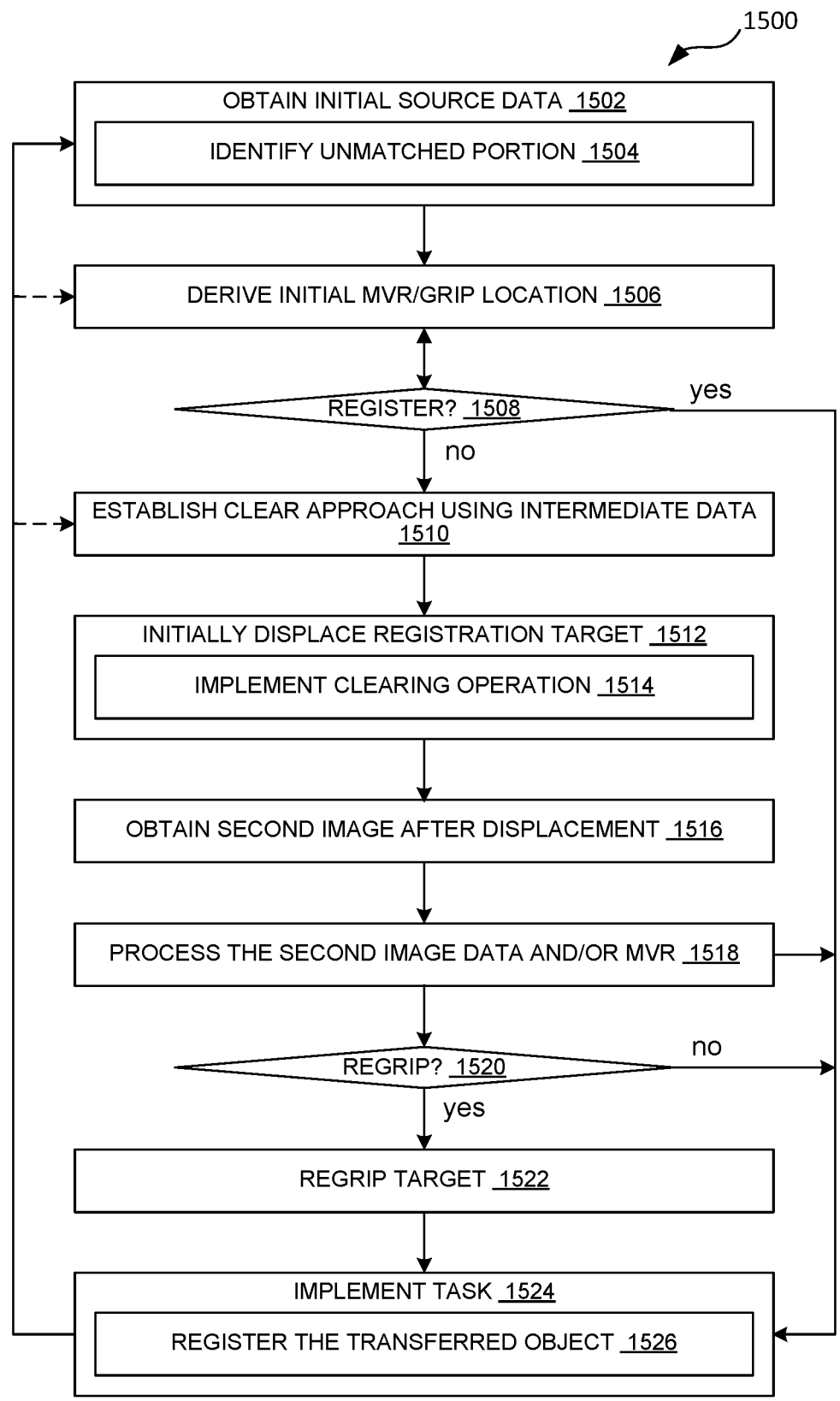
FIG. 15 is a flow diagram for a method of operating the robotic system of FIG. 1 in accordance with one or more embodiments of the present technology.

FIG. 15 is a flow diagram for a method 1500 of operating the robotic system of FIG. 1 in accordance with one or more embodiments of the present technology. The method 1500 can be for deriving and verifying MVRs and registering unknown objects (e.g., the unrecognized objects 414 of FIG. 4B) accordingly. In some embodiments, the method 1500 can include registering the unrecognized objects 414 while or as part of transferring the unrecognized objects 414 from the start location 114 of FIG. 1 (e.g., the target stack 310 of FIG. 3) to the task location 116 of FIG. 1 (e.g., the conveyor 306 of FIG. 3). The method 1500 can be implemented based on executing the instructions stored on one or more of the storage devices 204 of FIG. 2 with one or more of the processors 202 of FIG. 2. Accordingly, the one or more processors 202 may implement operations (by, e.g., generating/sending commands, settings, and/or plans) to control one or more units (e.g., the robotic arm 302 of FIG. 3, the end-effector 304 of FIG. 3, the sensors 216 of FIG. 2, etc.) and/or components therein.

At block 1502, the robotic system 100 can obtain initial source data (e.g., a first image data). The robotic system 100 can receive the first image data including 2D/3D image data from the top-view sensors 312a of FIG. 3 and/or optionally from the side-view sensors 312b of FIG. 3. The obtained first image data can depict or represent one or more objects (e.g., the recognized objects 412 of FIG. 4B and/or the unrecognized objects 414 of FIG. 4B) at the start location 114.

At block 1504, the robotic system 100 can identify unmatched portions in the initial source data. In some embodiments, the robotic system 100 can identify the unmatched portions in the initial source data based on detection of registered objects. For example, the robotic system 100 can detect registered objects at the start location 114 based on analyzing the first image data. As a specific example, the robotic system 100 can compare the first image data or portions thereof to the master data 252 of FIG. 2. The master data 252 can include images or data corresponding to images that represent known surfaces of registered objects in the corresponding registration data 254 of FIG. 2. As such, the robotic system 100 can detect the recognized objects 412 when portions of the first image data match images in the registration data 254 of FIG. 2. The robotic system 100 can identify remaining portions in the first image data as the unmatched portion 430 of FIG. 4B that represents one or more of the unrecognized objects 414.

At block 1506, the robotic system 100 can derive initial MVR(s) and/or determine corresponding grip location(s). The robotic system 100 can identify surface segments and/or edges in the first image data and use the identified surface segments/edges/corners to derive one or more of the initial MVRs (e.g., the MVRs 512 of FIG. 5B) as described above. Each of the initial MVR can represent an initial estimate of one surface of one unrecognized object. In some embodiments, the robotic system 100 can derive one initial MVR for each iteration of processes corresponding to blocks 1506-1524 described below. In other embodiments, the robotic system 100 can derive all available instances of the initial MVR and iterate through processes corresponding to blocks 1510-1524 described below.

The robotic system 100 can use the initial MVR to derive an initial grip location (e.g., the grip location 520 of FIG. 5B). For example, the robotic system 100 can derive the initial grip location as a middle portion of the initial MVR.

At decision block 1508, the robotic system 100 can analyze the initial MVR to detect whether a direct registration condition is present. When the direct registration condition is present, the robotic system 100 can determine the initial MVR as a finalized MVR. In such conditions, the robotic system 100 can directly register the object by creating a new registration data with the initial MVR (i.e., without any adjustments thereto) as described below for block 1526. The robotic system 100 can also implement and complete a task (e.g., without implementing the processes corresponding to blocks 1512-1522) when the direct registration condition is detected.

To analyze the initial MVR, the robotic system 100 can identify exposed edges (e.g., the exposed edges 422 of FIG. 4C) depicted in the first image data that represent estimated boundaries of the surface also depicted in the comparison image data (e.g., second image data) as described above. The robotic system 100 can further identify exposed corners (e.g., the exposed outer corners 426 of FIG. 4C where a pair of the exposed edges intersect) as described above.

The robotic system 100 may detect the direct registration condition by verifying a size and/or a shape of the initial MVR. The robotic system 100 can determine dimensions and/or shape of the initial MVR using computer vision processes. The robotic system 100 can verify the initial MVR when the shape matches expected object shapes provided to the robotic system 100 (e.g., from a human operator and/or an object supplier). Also, the robotic system 100 can verify the initial MVR when its dimensions are greater than those of a minimum object dimension and less than a maximum object dimension provided to the robotic system 100 (e.g., from a human operator and/or an object supplier).

For the verified MVRs, the robotic system 100 may detect the direct registration condition when adjacent locations around the estimated surface (e.g., according to the separation threshold 812 of FIG. 8A) has a different image property. For example, the robotic system 100 can detect the direct registration condition when 3D depth measures for the adjacent locations are located at least a threshold distance below the estimated surface. The robotic system 100 may also detect the direct registration condition when the verified MVRs include or derived using a number of the exposed corners exceeding a threshold (e.g., two).

When the direct registration conditions are not present in the initial MVR, the robotic system 100 can implement operations/processes to verify the MVR. At block 1510, the robotic system 100 can establish a clear approach using intermediate imaging data. For example, the robotic system 100 can generate a positioning plan (e.g., a motion plan) for placing the end-effector 304 over the initial grip location within the initial MVR. The robotic system 100 can communicate the positioning plan and/or commands/settings corresponding to the positioning plan to the robotic arm 302, and the robotic arm 302 may execute the commands, the settings, and/or the positioning plan to place the end-effector 304 accordingly. Subsequently, the robotic system 100 can operate the first imaging sensor 312 of FIG. 3 (e.g., the top-view sensors 312a), such as by sending corresponding commands, to obtain an intermediate image (e.g., the intermediate image data 1400 of FIG. 14). The robotic system 100 can analyze the intermediate image data to identify the accessory occlusion portions 1402 of FIG. 14 therein. If any of the accessory occlusion portions 1402 are identified, the robotic system 100 can generate and implement an adjustment plan (e.g., a predetermined motion plan) for moving the end-effector 304 to one or more locations away from the initial grip location and then re-places the end-effector 304 over the grip location. The robotic system 100 may iteratively repeat the above-described analysis and adjustment until no accessory occlusion portions 1402 are identified in the intermediate image data, such as portions around the location of the end-effector 304. For example, the adjustment plan can be generated based on the identification of the accessory occlusion portions 1402, wherein the adjustment plan can be for removing the end-effector 304 to one or more locations away from the grip location 520 and then re-placing the end-effector 304 over the grip location 520.

At block 1512, the robotic system 100 can initially displace a registration target (e.g., the registration target 506, such as one of the unrecognized objects 414 represented in the unmatched portion 430 of FIG. 4B). The robotic system 100 can implement operations for initially lifting and/or laterally displacing the registration target 506 according to a predetermined direction, predetermined distance, and/or a set of maneuvers. For example, the robotic system 100 can send a predetermined plan or a corresponding set of commands/settings to the robotic arm 302 and/or the end-effector 304 to implement the operations. Accordingly, the end-effector 304 can contact and grip the registration target 506 at the grip location, and the robotic arm 302 can raise the end-effector 304 according to the initial lift height 904 of FIG. 9B.

In some embodiments, the robotic system 100 may implement a clearing operation as part of initially displacing the registration target (e.g., the unrecognized objects 414) as illustrate at block 1514. For example, while and/or after lifting the gripped registration target 506, the robotic system 100 can implement operations for laterally displacing the end-effector 304 and/or rotating the end-effector 304 about a vertical axis. The clearing operation reduces the occurrence of the bitten condition described above.

At block 1516, the robotic system 100 can obtain a comparison image (e.g., the second image data, such as the comparison data 702 of FIG. 7A) after the initial displacement of the registration target. For example, the robotic system 100 can command the first imaging sensor 312 to capture one or more depictions of the registration target 506 after the initial displacement operation. The first imaging sensor 312 can send the resulting second image data to the one or more processors 202 for computer vision analysis. As described above, the second image data can include 2D and/or 3D depictions, top-view depictions and/or side-view depictions, or a combination thereof.

At block 1518, the robotic system 100 can process the second image data and/or the initial MVR. The robotic system 100 can analyze the second image data by identifying edges, such as the exposed edges, determining shapes/lengths thereof, and/or comparing the edges to predetermined patterns. For example, the robotic system 100 can determine the edge length measurement 728 for one of the exposed edges in the second image data. Accordingly, the robotic system 100 can detect a condition that represents an accuracy associated with the initial MVR. The robotic system 100 can evaluate the initial MVR according to the detect condition. Based on the evaluation, the robotic system 100 can generate the finalized MVR. The finalized MVR can be the initial MVR for one or more conditions. In other words, the robotic system 100 can generate the finalized MVR by determining the initial MVR as the finalized MVR based on the expected condition. For other conditions, the finalized MVR can be an adjusted MVR (e.g., the updated data 740 of FIG. 7B) resulting from removing portions from the initial MVR or from extending its boundaries to include additional portions from the first image data. Details regarding the processing of the second image data and/or the initial MVR are described below.

At decision block 1520, the robotic system 100 can detect whether a regrip condition exists based on the results of processing the second image. The robotic system 100 can detect the regrip condition at least partially based on evaluating the initial MVR. For example, the robotic system 100 may detect an absence of the regrip condition following detection of the expected condition (i.e., the end-effector 304 is centered according to an accurate derivation of the initial MVR). Also, the robotic system 100 may detect an absence of the regrip condition based on evaluating the gripped surface for the bitten condition and/or the calculated object dimension 1118 of FIG. 11 for the deformed-object condition.

The robotic system 100 may detect the regrip condition when lengths of one or more edges in the second image data exceeds a corresponding dimension of the initial MVR by a predetermined limit. In other words, the robotic system 100 can regrip the registration target 506 when the lifted object has a surface that is sufficiently larger than the initial MVR. In some embodiments, the robotic system 100 can further obtain and compare the downward force measurement 604 of FIG. 6 and/or the estimated torque-arm vector 608 to predetermined limits/conditions to detect the regrip condition.

At block 1522, the robotic system 100 may implement operations for regripping the registration target 506 when the regrip condition is detected. The robotic system 100 can derive an updated grip location (e.g., a further instance of the grip location 520) based on the adjusted MVR. For example, the robotic system 100 can derive the updated grip location to include a center portion of the adjusted MVR. Accordingly, the robotic system 100 can implement operations to re-place the registration target 506 at its original location, such as by reversing the initial lift operation (e.g., without the clearing operation) and lowering and laterally displacing the end-effector 304. After returning to the original location, the robotic system 100 can command the end-effector 304 to release the registration target 506. The robotic system 100 can derive a regripping plan to move the end-effector 304 from the current location to over the updated grip location, lower/contact the registration target 506, and then grip the registration target 506. The robotic system 100 can implement the operations for the regripping plan to complete the regripping operations. The robotic system 100 can skip the regripping operation when the regrip condition is not detected.

At block 1524, the robotic system 100 can implement a task associated with the registration target. For example, the robotic system 100 can implement the task by transferring the registration target 506 from the start location 114 to the task location 116 of FIG. 1. The robotic system 100 can derive a motion plan for performing the task and then implement operations corresponding to the task motion plan. The robotic system 100 can send the task motion plan and/or associated commands/settings to one or more robotic units (e.g., the robotic arm 302 and/or the end-effector 304) to implement the operations. The robotic units can execute the received plan/command/setting to carry out the task.

At block 1526, the robotic system 100 can register the transferred object. In some embodiments, the robotic system 100 can register the transferred object while (e.g., in parallel with) implementing the task. For example, the robotic system 100 can create a new instance of the registration data 254 (e.g., the new registration data) that represents a new record for the registration target 506. The robotic system 100 can store the finalized MVR and/or associated processing results (e.g., dimensions and/or images) as part of the registration data 254, including the new registration data.

The robotic system 100 can track real-world component locations (e.g., locations/poses of the robotic arm 302, the end-effector 304, and/or portions thereof) during the various operations described above. Examples of the real-world component locations can include description of current poses of an end-effector 304 gripping the unrecognized objects 414 and the robotic arm 302 operably coupled to the end-effector 304, as described above, and positioning the robotic arm 302 during the implementations. Tracking the real-world component locations can, for example, include tracking during implementing the operations for the initial displacement and/or during implementing the operations for performing the task. Accordingly, the robotic system 100 can determine locations/poses of the end-effector 304 and/or the robotic arm 302 at the times when various images are obtained (e.g., the first image data, the second image data, etc.). For example, the robotic system 100 can use the tracked locations to process the images as described below.

Figure 16:
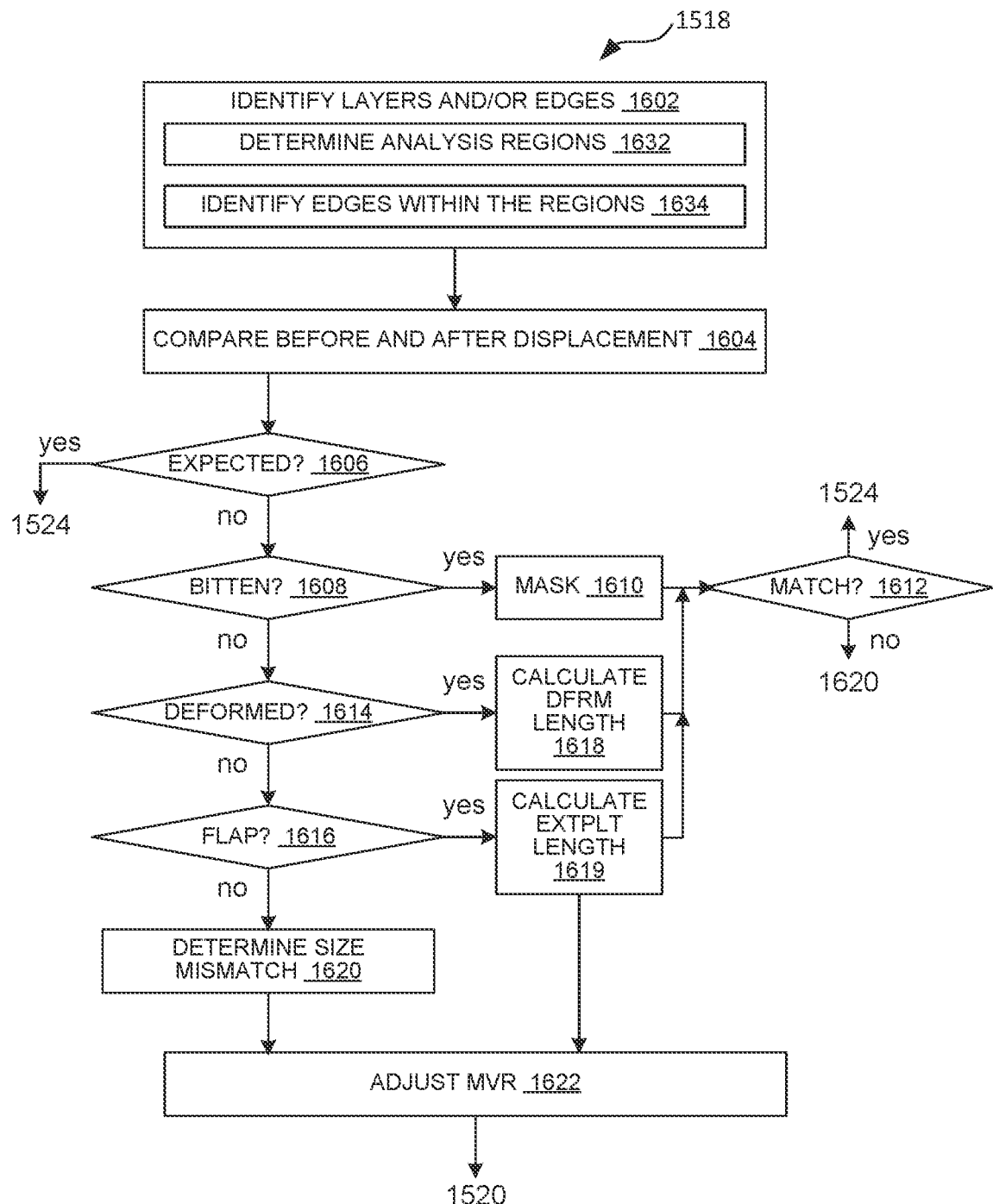
FIG. 16 is an example flow diagram for processing and an image and/or an MVR after implementing an initial maneuver in accordance with one or more embodiments of the present technology.

FIG. 16 is an example flow diagram for processing and an image and/or an MVR after implementing an initial maneuver in accordance with one or more embodiments of the present technology. FIG. 16 illustrates a detailed example of the processes described above for block 1518 of FIG. 15.

At block 1602, the robotic system 100 can identify layers and/or edges in the second image data (e.g., the comparison data 702 of FIG. 7A). The robotic system 100 can process the 2D images, the 3D images, the side-view depictions, the top-view depictions, or a combination thereof to determine the edges (e.g., the exposed edges 422) as described above. The robotic system 100 can determine each of the layers as a set of laterally adjacent locations in the processed image that have depicted values (e.g., depth measures, brightness, color, etc.) within a threshold range of each other and/or follow a predetermined pattern (e.g., linear slopes or concave curves). The layers may be bounded by the detected edges. In other words, the identified edges may represent estimated boundaries of one or more surfaces depicted in the second image data. The robotic system 100 may determine the edge length measurements 728 of FIG. 7A for the identified edges.

In some embodiments, the robotic system 100 can categorize the edges according to their locations/orientations in comparison to the tracked location of the end-effector and/or the initial lift operation. For example, the robotic system 100 can recognize the edges corresponding the exposed edges 422 of FIG. 4C in the first image data based on a translation that matches the initial lift operation. Also, the robotic system 100 can identify the discovered edges 722 of FIG. 7A that may not have been depicted or identified from the first image data. In some embodiments, the robotic system 100 can further identify a gripped surface having a linear pattern within a predetermined distance from (e.g., immediately below and laterally extending outward from) the tracked end-effector location.

In identifying the layers/edges, the robotic system 100 can determine and analyze specific regions that exclude the occluded regions 912 of FIG. 9C. At block 1632, the robotic system 100 can determine analysis regions (e.g., the analysis regions 922 of FIG. 9C) in the second image data. For example, the robotic system 100 can map the tracked locations of the robotic arm 302 and/or the end-effector 304 to determine or estimate locations of the occluded regions 912. The robotic system 100 can compare the tracked locations to identify clear edges/corners that are not occluded by (e.g., not laterally overlapped under) the robotic arm 302 and/or the end-effector 304. The robotic system 100 can also identify the clear edges/corners that are outside of a lateral threshold distance from the tracked component locations. In one implementation, the robotic system 100 can identify the clear edge from among the exposed edges in the second image data. For example, identifying the clear edges can include determining that the exposed edges 422 in the second image data are outside of the lateral threshold distance from the tracked component locations.

As described above, the robotic system 100 can determine the analysis regions 922 by deriving the analysis boundaries 916 of FIG. 9C according to the clear edge. The analysis regions 922 can correspond to portions of the second image data bounded by the clear edge on one side and by the analysis boundaries 916 on an opposing side. The robotic system 100 can derive the analysis boundaries parallel to the corresponding clear edge. The robotic system 100 can derive the analysis boundaries 916 according to a predetermined separation from the tracked component locations and/or from the corresponding clear edge. In some embodiments, the robotic system 100 can derive a pair of the analysis boundaries 916 that are orthogonal to each other and extend from a clear corner where a pair of the clean edges intersect. The robotic system 100 can determine the area of the second image data bounded by the analysis boundaries 916 and outside the analysis regions 922 as the masked region 924 of FIG. 9C. The robotic system 100 may ignore the masked regions 924 and process the analysis regions 922, such as for identifying the edges, determining the lengths, etc.

At block 1634, the robotic system 100 can identify edges within the analysis regions 922. As an example of processing the analysis regions 922, the robotic system 100 can start from a first edge in the analysis region and iteratively move along the clear edge to identify a complementary edge that intersects the clear edge at an angle in the analysis regions 922. The robotic system 100 can identify the intersecting edges as bounding/defining the surface. The robotic system 100 can determine the edge length measurement of the clear edge as a distance between the first edge and the identified complementary edge.

At block 1604, the robotic system 100 can compare the images obtained before and after the initial displacement. In other words, the robotic system 100 can compare the first image data and the second image data and/or the processing results thereof. For example, the robotic system 100 can compare the visual image patterns for the analysis regions 922 to corresponding portions of the initial MVR (e.g., the MVR 512 of FIG. 5B). Also, the robotic system 100 can compare the edge length measurements 728 of the clear edges to the dimensions of the initial MVR. In comparing the two sets of lengths, the robotic system 100 can use a predetermined process/equation to compensate for the size change caused by the initial displacement. For example, the robotic system 100 can map the edge length measurements 728 to the height of the object in the first image data. Also, the robotic system 100 may map all of the determined lengths to real-world distances.

The robotic system 100 can detect a condition that represents an accuracy of the initial MVR at least partially based on the comparison. In other words, the robotic system 100 may evaluate the initial MVR based on the exposed edges in the second image data.

At decision block 1606, the robotic system 100 can determine whether the expected condition exists. The robotic system 100 can detect the expected condition when one or more portions and/or the exposed edges of the second image data match (e.g., matching visual appearances and/or matching dimensions) corresponding portions of the initial MVR as described above. When the expected condition is detected, the method 1500 of FIG. 15 can proceed to block 1524 of FIG. 15 and implement the task/register the object as described above. When the expected condition is not detected, the robotic system 100 can detect the unexpected condition due to one or more portions and/or the exposed edges of the second image data failing to match corresponding portions of the initial MVR.

Based on detecting the unexpected condition, the robotic system 100 may search for/identify the object separation portion 1204 of FIG. 12 between a set of the exposed edges. For example, the robotic system 100 can move beyond the complementary edges in the analysis regions 922 until another edge/surface is identified. The robotic system 100 can identify the object separation portion 1204 as a set of depicted locations that are located between the identified edges and have discontinuous image values in comparison to the edges and their associated surfaces. In some situations, the object separation portion 1204 may be an edge without a width, where two surfaces abut each other at different heights. In other situations, the object separation portion 1204 may correspond to a lateral separation between the two surfaces. The robotic system 100 may use the object separation portion 1204 to detect different types of the unexpected condition.

At decision block 1608, the robotic system 100 can determine whether the bitten condition exists. The robotic system 100 may detect the bitten condition based on comparing the exposed edges and/or the gripped surface to the predetermined shape pattern and/or one or more corresponding rules. For example, the robotic system 100 can detect the bitten condition when the gripped surface deviates from a linear/lateral slope. The robotic system 100 can further detect the bitten condition based on identifying the object separation portion 1204 adjacent to/abutting the gripped surface and/or a lateral separation component of the object separation portion 1204. The robotic system 100 can further detect the bitten condition based on identifying another surface (e.g., an angled or a concave surface) adjacent to/abutting the object separation portion 1204 opposite the gripped surface. In other words, the robotic system 100 can detect the bitten condition when an edge of the gripped surface (e.g., a first edge) is between an edge of the other identified surface (e.g., a second edge) and a determined gripper location in the processed image, with the object separation portion 1204 between or coinciding with the two edges.

In some embodiments, the robotic system 100 can identify the gripped edge and a bottom edge directly below the gripped edge, such as optionally in the 3D side-view depiction of the second image data. The robotic system 100 can search for another bottom edge below the gripped edge and laterally past the object separation portion 1204. The robotic system 100 can follow the second bottom edge and further search for the contact point 1206 of FIG. 12 where the second bottom edge intersects another edge located underneath. The second bottom edge may correspond to the adjacent object 1202 of FIG. 12. As such, the robotic system 100 can detect the bitten condition when (1) the contact point 1206 exists and/or (2) when the gripped edge and the second bottom edge do not laterally overlap. The non-overlapping edges can further correspond to identifying the two separate bottom edges that have different slopes.

When the bitten condition is detected, the robotic system 100 may mask portions outside of the gripped surface (e.g., the object separation portion 1204 and beyond) as illustrated in block 1610. The robotic system 100 can repeat the comparison process, as illustrated at decision block 1612, to determine whether the initial MVR matches the gripped surface. The robotic system 100 can compare the unmasked portion of the second image data to the initial MVR, similarly as described above for block 1606. When the unmasked portions match the initial MVR as described above, the method 1500 can proceed to the processes described above for blocks 1524 and 1526 to perform the task and register the object. When the unmasked portions fail to match the initial MVR, the method can proceed to block 1620 and conclude that the target object has dimensions not matching the initial MVR. The robotic system 100 can then adjust the MVR as further detailed below.

Otherwise (e.g., when the bitten condition is not detected), the robotic system 100 can determine whether the deformed-object condition exists, such as illustrated at decision block 1614. The robotic system 100 can detect the deformed-object condition as described above. For example, the robotic system 100 can detect the deformed-object condition when the exposed edges deviate from a linear shape pattern and/or matches a concave/convex pattern. Also, optionally, the robotic system 100 can detect the deformed-object condition when the bottom edge in the 3D side-view depiction remains continuous and curves upward/downward moving away from the tracked end-effector location.

When the deformed-object condition is detected, the robotic system 100 can calculate a length for the deformed edge, such as illustrated at block 1618. The robotic system 100 may determine the calculated object dimension 1118 of FIG. 11A as described above. For example, the robotic system 100 can select the deformed edge and derive one or more of the analysis strips 1112 of FIG. 11B in second image data (e.g., the 3D top-view depiction) that are parallel/coincident with the selected edge. The robotic system 100 can further derive analysis locations (e.g., edges of the analysis sections 1114 of FIG. 11B) that correspond to within each of the analysis strips 1112. The analysis locations can be depicted locations (e.g., defined by x-y coordinate pairs) in the 3D point cloud separated by a fixed distance along a direction parallel to the selected exposed edge. Using the depth measures at the analysis locations, the robotic system 100 can calculate the section lengths 1116 of FIG. 11A corresponding to a straight-line distance between an adjacent pair of 3D positions corresponding to the analysis locations. The robotic system 100 can derive the calculated object dimension 1118 based on the section lengths 1116 (e.g., a sum thereof). For example, the calculated object dimension 1118 can represent an estimate of the straight-line distance of an edge (i.e. an edge of the top surface) of the unrecognized objects when placed on a flat surface. When multiple analysis strips 1112 are available, the robotic system 100 may derive the calculated object dimension 1118 as an average of the summed lengths of the analysis strips 1112.

At decision block 1612, the robotic system 100 can use the calculated object dimension 1118 to check whether the distorted gripped surface matches the initial MVR. For example, the robotic system 100 can compare the calculated object dimension 1118 (e.g., the edge length measurements from the second image data) to the corresponding dimension of the initial MVR. When the non-distorted dimensions and/or the calculated object dimension 1118 of the gripped surface match the corresponding dimensions of the initial MVR, the method 1500 can proceed to processes for blocks 1524 and 1526 as described above. Otherwise, the method 1500 can proceed to the process detailed below for block 1620.

At decision block 1616, the robotic system 100 can determine whether the open-flap condition exists. The robotic system 100 can detect the open-flap condition as described above. For example, the robotic system 100 can detect the open-flap condition when another edge between the gripped edge and the bottom edge intersects the gripped edges at an open angle 1304 of FIG. 13. Also, the robotic system 100 can detect the open-flap condition when the bottom edge is not parallel with the gripped edge, extends at the open angle 1304, and/or extends beyond lateral ends of the gripped edge in the 3D side-view depiction. Further, the robotic system 100 can detect the open-flap condition based on comparing the gripped edge, according to a determined gripper location, the bottom edge (i.e. a second edge), and/or the additional edge (i.e. a first edge) in between the two edges to a predetermined shape pattern. For example, detecting the open-flap condition can include identifying the first edge between the second edge and the determined gripper location, and forms an open angle with a second edge; and comparing the first edge and the second edge to the predetermined shape pattern. Additionally, the robotic system 100 can determine the open-flap condition based on identifying an absence of lateral discontinuity in the object separation portion 1204 of FIG. 13 and/or according to the estimated torque-arm vector 608 of FIG. 6, such as when the portions extending beyond the tracked gripper location fails to match a direction of the estimated torque-arm vector 608.

When the open-flap condition is detected, the robotic system 100 can calculate a length for the extrapolated edge, such as illustrated at block 1619. The robotic system 100 may determine the calculated object dimension corresponding to the full length of the target object as described above. For example, the robotic system 100 can determine the gripped length 1302 of FIG. 13 for the gripped edge (e.g., a first edge). The robotic system 100 can further measure the remaining length 1310 of FIG. 13 according to the open angle 1304. The remaining length 1310 can represent a length for a portion of an angled edge (e.g., a second edge forming the open angle with the first edge) that extends beyond the gripped edge or a mapping thereof. The robotic system 100 can determine the calculated object dimension according to the gripped length 1302 and the remaining length 1310. In some embodiments, the robotic system 100 can determine or verify the calculated object dimension based on the edge length measurement 728 corresponding to the additional edge in between the gripped edge and the bottom edge.

In some embodiments, the robotic system 100 can use the calculated object dimension to determine a match. In other embodiments, the method 1500 can proceed to the process corresponding to block 1622, which is described in detail below. When the robotic system 100 fails to detect specialized conditions (e.g., the bitten condition, the deformed-object condition, and/or the open-flap condition), the robotic system 100 may determine/conclude that the unexpected condition was caused by a mismatch between the sizes of the actual object and the initial MVR.

At block 1622, the robotic system 100 can adjust the MVR, such as by generating the finalized MVR (e.g., the updated data 720 of FIG. 7B) according to the analysis results described above (i.e. detecting the expected condition and/or the unexpected condition). For example, the robotic system 100 can generate the finalized MVR by adjusting the initial MVR to remove portions therein or adding additional portions adjacent thereto. The robotic system 100 may adjust the initial MVR by using the first image data according to the one or more portions and/or the exposed edges of the second image data. The robotic system 100 may generate the finalized MVR that includes the initial MVR and the additional portions in the first image data that are adjacent to the initial MVR. The robotic system 100 may generate the finalized MVR that includes without removed portions therein. The robotic system 100 can adjust the initial MVR according to: the edge length measurements 728 for the dimension mismatch condition (e.g., when the edge length measurements 728 fails to match a corresponding dimension of the initial MVR), the gripped length 1302 for the bitten condition, the calculated object dimension or the remaining length 1310 and the length of the first edge for the open flap condition, and/or the calculated object dimension 1118 for the deformed-object condition.

The robotic system 100 detecting the various conditions as described above based on comparing the first image data and the second image data provides increased accuracy in detecting and registering objects. Through the detected condition, the robotic system 100 can identify a cause/basis for the mismatch in the initial MVR and the actual depiction of the registration target 506. Accordingly, the robotic system 100 can adjust the initial MVR to accurately represent the registration target 506. Moreover, the robotic system 100 analyzing the edges using the analysis regions 922 of FIG. 9C, the analysis strips 1112 of FIG. 11B, and/or the analysis sections 1114 of FIG. 11B provide improved processing efficiency. The various aspects described above can provide approximations that lessen or remove resources required to implement computer vision mechanisms (e.g., image analysis routines required to fully identify/locate the occluded regions 912 of FIG. 9C).

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A method comprising:
obtaining first image data representative of one or more surfaces of an unrecognized object;
deriving an initial minimum viable region (MVR) based on the first image data;
obtaining second image data representing the unrecognized object after an initial displacement of the unrecognized object;
identifying exposed edges representing estimated boundaries of a surface depicted in the second image data;
evaluating the initial MVR based on the exposed edges in the second image data;
generating a finalized MVR based on evaluating the initial MVR; and
creating new registration data, representing a new record for the unrecognized object, that includes the finalized MVR.

2. The method of claim 1, wherein evaluating the initial MVR includes:
identifying a clear edge among the exposed edges in the second image data, wherein the clear edge represents an object edge not occluded by one or more robotic components used to displace the unrecognized object;
identifying a complementary edge that intersects the clear edge at an angle;
determining edge length measurements of the clear edge and the complementary edge; and
evaluating the initial MVR based on comparing the edge length measurements from the second image data to dimensions of the initial MVR.

3. The method of claim 2, further comprising:
implementing operations for performing the initial displacement of the unrecognized object; and
implementing operations for performing a task for the unrecognized object after the initial displacement.

4. The method of claim 3, further comprising:
tracking real-world component locations that describe current poses of an end-effector gripping the unrecognized object and a robotic arm operably coupled to the end-effector and positioning the robotic arm; and
wherein:
identifying the clear edge includes determining that the exposed edges in the second image data is outside of a threshold distance from the tracked component locations.

5. The method of claim 3, wherein implementing the operations for performing the initial displacement of the unrecognized object includes:
generating a positioning plan for placing an end-effector over a grip location within the initial MVR;
obtaining an intermediate image data after generating the positioning plan;
identifying an accessory occlusion portion in the intermediate image data, wherein the accessory occlusion portion represents a portion of the intermediate image data that depicts a predetermined pattern corresponding to untracked accessories associated with the end-effector and/or a robotic arm attached to the end-effector; and
generating an adjustment plan based on the identification of the accessory occlusion portion, wherein the adjustment plan is for removing the end-effector to one or more locations away from the grip location and then re-placing the end-effector over the grip location.

6. The method of claim 1, wherein the initial MVR represents an initial estimate of one of the surfaces of the unrecognized object.

7. The method of claim 1, wherein:
evaluating the initial MVR includes detecting an expected condition when one or more portions and/or the exposed edges of the second image data match corresponding portions of the initial MVR; and
generating the finalized MVR includes determining the initial MVR as the finalized MVR based on the expected condition.

8. The method of claim 1, wherein:
evaluating the initial MVR includes detecting an unexpected condition when one or more portions and/or the exposed edges of the second image data fail to match corresponding portions of the initial MVR; and
generating the finalized MVR includes adjusting the initial MVR using the first image data according to the one or more portions and/or the exposed edges of the second image data.

9. The method of claim 8, wherein evaluating the initial MVR includes:
determining an edge length measurement for one of the exposed edges in the second image data; and
generating the finalized MVR includes adjusting the initial MVR according to the edge length measurement when the edge length measurement fails to match a corresponding dimension of the initial MVR.

10. The method of claim 8, wherein:
evaluating the initial MVR includes:
detecting the unexpected condition including a deformed-object condition based on comparing the exposed edges to a predetermined shape pattern;
determining a calculated object dimension based on detecting the deformed-object condition; and
generating the finalized MVR includes adjusting the initial MVR according to the calculated object dimension.

11. The method of claim 10, wherein determining the calculated object dimension includes:
selecting one of the exposed edges based on the comparison with the predetermined shape pattern;
deriving an analysis strip in the second image data coincident with the selected exposed edge, wherein the second image data is a three-dimensional (3D) point cloud having depth measures for locations depicted therein;
deriving analysis locations within the analysis strip, wherein the analysis locations are depicted locations in the 3D point cloud separated by a fixed distance along a direction parallel to the selected exposed edge;
calculating section lengths based on depth measures associated with the analysis locations, wherein the section lengths each represent a straight-line distance between an adjacent pair of 3D locations corresponding to the analysis locations; and
deriving a calculated object dimension based on the section lengths, wherein the calculated object dimension represents an estimate of a straight-line distance of an edge of the unrecognized object when placed on a flat surface.

12. The method of claim 8, wherein evaluating the initial MVR includes:
detecting the unexpected condition including a bitten condition based on:
comparing the exposed edges to a predetermined shape pattern; and identifying an object separation portion between a first edge and a second edge, wherein the first edge is between the second edge and a determined gripper location;

determining an edge length measurement for the first edge when the bitten condition is detected; and comparing the initial MVR to the one or more portions of the second MVR according to the edge length measurement.

13. The method of claim 8, wherein:

evaluating the initial MVR includes:
detecting the unexpected condition including an open-flap condition based on:
identifying a first edge and a second edge, wherein the first edge is between the second edge and a determined gripper location, and forms an open angle with the second edge; and
comparing the first edge and the second edge to a predetermined shape pattern;
determining a calculated object dimension based on detecting the open-flap condition; and
generating the finalized MVR includes adjusting the initial MVR according to a remaining length and a length of the first edge.

14. The method of claim 13, wherein determining the calculated object dimension includes:

determining the length for the first edge; and measuring the remaining length representative of a portion of the second edge extending beyond the first edge.

15. A robotic system comprising:

at least one processor; and at least one memory device connected to the at least one processor and having stored thereon instructions executable by the processor for:
obtaining first image data representative of one or more surfaces of an unrecognized object;
deriving an initial minimum viable region (MVR) based on the first image data;
obtaining second image data representing the unrecognized object after an initial displacement of the unrecognized object;
identifying exposed edges representing estimated boundaries of a surface depicted in the second image data;
evaluating the initial MVR based on the exposed edges in the second image data;
generating a finalized MVR based on evaluating the initial MVR; and
creating new registration data, representing a new record for the unrecognized object, that includes the finalized MVR.

16. The robotic system of claim 15, wherein the unrecognized object is located at a start location.

17. The robotic system of claim 15, wherein the at least one memory device includes instructions for:

identifying a clear edge among the exposed edges in the second image data, wherein the clear edge represents an object edge not occluded;

determining an analysis region based on the clear edge, wherein the analysis region represents a portion of the second image data separate from occluded regions;

identifying a complementary edge in the analysis region, wherein the complementary edge intersects the clear edge; and comparing edge length measurements of the clear edge and the complementary edge to dimensions of the initial MVR.

18. A tangible, non-transitory computer-readable medium having processor instructions stored thereon that, when executed by one or more processors, cause the one or more processors to perform a method, the method comprising:

obtaining first image data representative of one or more surfaces of an unrecognized object;

deriving an initial minimum viable region (MVR) based on the first image data;

obtaining second image data representing the unrecognized object after an initial displacement of the unrecognized object;

identifying exposed edges representing estimated boundaries of a surface depicted in the second image data;

evaluating the initial MVR based on the exposed edges in the second image data;

generating a finalized MVR based on evaluating the initial MVR; and creating new registration data, representing a new record for the unrecognized object, that includes the finalized MVR.

19. The tangible, non-transient computer-readable medium of claim 18 having processor instructions to perform the method, wherein the method further comprises:

implementing operations for performing the initial displacement of the unrecognized object according to a predetermined direction and a predetermined distance; and implementing operations for performing a task for the unrecognized object after the initial displacement.

20. The tangible, non-transient computer-readable medium of claim 19, wherein creating the new registration data includes: creating the new registration data while implementing the task.

* * * * *